(12) United States Patent
Cheng et al.

(10) Patent No.: US 9,544,228 B2
(45) Date of Patent: Jan. 10, 2017

(54) METHOD OF CREATING SOURCE IP ADDRESS BUNCHES IN A ROUTER, AND ROUTER COMPRISING A NETWORK ROUTING SYSTEM COMPRISING SOURCE IP ADDRESS BUNCHES

(71) Applicant: THE PLA INFORMATION ENGINEERING UNIVERSITY, Zhengzhou (CN)

(72) Inventors: Dongnian Cheng, Zhengzhou (CN); Jvlong Lan, Zhengzhou (CN); Guozheng Cheng, Zhengzhou (CN); Hailong Ma, Zhengzhou (CN); Shuqiao Chen, Zhengzhou (CN); Jianhui Zhang, Zhengzhou (CN); Baojin Wang, Zhengzhou (CN); Peng Yi, Zhengzhou (CN); Fengyu Zhang, Zhengzhou (CN)

(73) Assignee: THE PLA INFORMATION ENGINEERING UNIVERSITY, Zhengzhou (CN)

( * ) Notice: Subject to any disclaimer, the term of this patent is extended or adjusted under 35 U.S.C. 154(b) by 497 days.

(21) Appl. No.: 13/932,063

(22) Filed: Jul. 1, 2013

(65) Prior Publication Data
US 2013/0297824 A1  Nov. 7, 2013

Related U.S. Application Data

(63) Continuation-in-part of application No. PCT/CN2011/079262, filed on Sep. 9, 2011.

(30) Foreign Application Priority Data

Dec. 30, 2010  (CN) .......................... 2010 1 0615488

(51) Int. Cl.
G06F 13/00 (2006.01)
H04L 12/56 (2006.01)
H04L 12/741 (2013.01)
H04L 29/12 (2006.01)

(52) U.S. Cl.
CPC ............ H04L 45/741 (2013.01); H04L 45/74 (2013.01); H04L 61/2007 (2013.01); H04L 61/6068 (2013.01); H04L 61/1511 (2013.01)

(58) Field of Classification Search
CPC .... H04L 45/00; H04L 29/06; H04L 29/08072; H04L 29/08144; H04L 29/12009; H04L 45/74; H04L 45/741; H04L 61/1511; H04L 61/2007; H04L 61/6068
USPC ....................................... 709/238
See application file for complete search history.

(56) References Cited

U.S. PATENT DOCUMENTS

| | | |
|---|---|---|
| 6,202,106 B1 * | 3/2001 | Baxter ........................... 710/22 |
| 8,218,537 B1 * | 7/2012 | Gui et al. ...................... 370/369 |
| 2007/0121664 A1 * | 5/2007 | Szczebak et al. ............ 370/449 |

* cited by examiner

Primary Examiner — Robert B Harrell
(74) Attorney, Agent, or Firm — Matthias Scholl, PC; Matthias Scholl

(57) ABSTRACT

A method of aggregation of a source address bunch. The method includes constituting a source address block, associating the source address block to form a source address bunch, and allocating, split, merging, and aggregating the source address bunch.

14 Claims, 16 Drawing Sheets

Linear association $f^1_1$ (consecutive blocks: i=0,1,...,9)
$f^1_1 = 56.109.4.0 + 1024*i, \quad i=0,1,...,9$ Linear association $f^1_2$ (discontinuous blocks: i=0,2,3,4,5,8,9)
$f^1_2 = 57.109.4.0 + 1024*i, \quad i=0,2,3,4,5,8,9$ Index association $f^e_1$ (consecutive index values : i=0,1,...,5)
$f^e_1 = 209.18.0.0 + 1024 \ (2^i-1), i=0,1,...,5$ Index association $f^e_2$ (discontinuous index values: i=0,1,3,4,5,7)
$f^e_2 = 209.39.0.0 + 1024 * (2^i-1), \ i=0,1,3,4,5,7$

METHOD OF CREATING SOURCE IP ADDRESS BUNCHES IN A ROUTER, AND ROUTER COMPRISING A NETWORK ROUTING SYSTEM COMPRISING SOURCE IP ADDRESS BUNCHES

CROSS-REFERENCE TO RELATED APPLICATIONS

This application is a continuation-in-part of International Patent Application No. PCT/CN2011/079262 with an international filing date of Sep. 9, 2011, designating the United States, now pending, and further claims priority benefits to Chinese Patent Application No. 201010615488.0 filed Dec. 30, 2010. The contents of all of the aforementioned applications, including any intervening amendments thereto, are incorporated herein by reference.

BACKGROUND OF THE INVENTION

Field of the Invention

The invention relates to the field of network communication technology, and more particularly to a method of aggregation of source address bunches and a network routing system.

Description of the Related Art

IP network is the infrastructure of Internet communications, and packet switching and routing are two core elements of an IP network. The exponential increase of the amount of hosts and subnets on the Internet with time, the use of unrelated addresses of the provider by customer network, the deployment of traffic engineering, multi-host connection and many other factors are making the IP network routing system face unprecedented scalability challenges.

In the past two decades, the size of the Internet has increased over time, approximately being exponential growth model, which can be seen from the exponential increase of the amount of hosts and subnets on the Internet.

Data show that there are nearly billions of hosts on the Internet, while the size of autonomous domain (i.e. AS), the number of autonomous domains and the number of connections to the Internet of each AS on the Internet, are also increasing rapidly.

One of the direct consequences of the rapid increase of internet is that the amount of inter-domain routing states established and maintained by inter-domain routing systems is increasing fast, which causes the subnet to expand its own address capacity by adding new prefix, while the increase of the number of subnets directly contributes to the increase of routing table entries of global routing nodes.

The direct consequence of the increased number of internet global routing table is that the number of routing states preserved and maintained by intra-domain and inter-domain routing nodes approaches to exponential increase, that is, the number of routing table entry of routing nodes increases exponentially. Such an increase directly leads to the huge storage overhead and processing overhead in processing routing tables, a low efficiency in packet forwarding, slow convergence speed of routing calculation, more power and cost consumption required for processing, etc. In addition, the large amount of global routing table entry also implies the need for more routes advertised by routing protocols, the direct consequence of which is the instability of the global routing protocol.

Network routing scalability indicates that the speed of increase of routing states of each routing node in the network routing system is less than the speed of increase of the connected hosts, subnets, and the total routing nodes. For example, when the number of hosts or subnets increases near-exponentially along with time, the amount of routing state of routing node increases linearly along with time. IP network routing system usually establishes routing information for each host and subnet with a public IP address. An effective way to solve the scalability issue is to constitute address aggregation. The core of address aggregation technology is making multiple routing states present as a single through the format of compression, whereby forming a scalable network in general. Currently, the only available address aggregation technique for Internet routing system is CIDR (Classless Inter-Domain Routing). The essence of CIDR is: based on the variable-length mask VLSM (Variable Length Subnet Mask) technology, making multiple smaller addresses prefixes which represent like a numerically "continuous (power of 2)" aggregated into a single large address prefixes. From the perspective of the network topology, with the corresponding address assignment method, CIDR abandoned the classification according to IP address structure (before CIDR occur, IP addresses are divided into five categories, A, B, C, D and E), and combine the multiple small networks corresponding to multiple contiguous blocks of IP addresses into a single large network, forming the so-called "super-network." On the other hand, from the perspective of network routing, since the number of routes is less after combining the routing table entries into a fewer entries, thus CIDR effectively reduces the number of routing entries that must be saved in the routing table. To the routing protocols, CIDR also reduces the number of routing advertisement that must be published and updated.

Twenty years ago, CIDR did reduce the number of routing entries in the routing table, but the fact that the routing table entries of routing node has increased near-exponentially in recent years. Today, Internet has been gone far beyond the capacity of aggregation of CIDR in size, speed, address, usage patterns, and many others. Since the scalability issue, especially solving the routing inter-domain routing has reached a critical state, in October 2006, the Internet Architecture Board IAB in IETF (Internet Architecture Board) held a special working conference for routing and addressing, RAWS (Amsterdam IAB Routing and Addressing Workshop) in Amsterdam, where the routing scalability was rated as a top issue to show the highest focus on it. The meeting drew the following conclusions: as the wide use of network multi-homing, traffic engineering and other technology, the number of Internet routing is growing rapidly and its speed is faster than Moore's Law curve. Although advances in hardware technology can support the sustained growth of routing tables in a given period, but the deep-seated problems such as routing instability is difficult to be solved through hardware technology. In addition, it will take many years for the mature of the new routing and addressing architecture technology and deployment, so we need to start research in this area as early as possible.

On the basis of consensus on the issue of the scalability of the Internet routing, the international academia and industry have done a lot of research and tried to put forward a number of solutions and programs and summed up in three categories as "PI elimination", "spatial separation" and "location".

Firstly, PI elimination method (Elimination). This method encourages or requires the network of the customer and service provider not to use non-aggregated "independent provider address (PI address)", and only use "address assigned by the provider" (i.e. PA address) obtained from a provider, which can be aggregated. The essence of PI eliminating method is still focusing on the maintenance of validity of CIDR "continuous addresses convergence", and the cost is completely sacrificing the flexibility of customers to choose service provider, and thus unable to adapt to the natural evolution of the Internet.

To strengthen the effects of convergence of the IPv4 CIDR address of PA types, a typical practice is that the regional address allocation mechanism RIR (including RIPE NCC, AfriNIC, APNIC, ARIN, and LACNIC) defined minimum size of address block allocated for users as ".*.*.*.*/21", while the introduction of the corresponding filtering mechanism in routing protocols allows routing entity to refuse routing announcements for address prefix size smaller than ".*.*.*.*/21". For IPv6, the minimum size of allocated address block is limited to ".*:*:*:*:*:*:*:*/32".

Secondly, the spatial separation (Separation). The method separates the network portions with two different types of PA and PI address. In particular, the local or the edge of the network can use PI addresses for local routing, while the global routing system of network will use aggregated PA address for the global routing. Setting "address space mapping" mechanism at the connection of the network portion of two different addresses of PA and PI to perform an interconnection between corresponding networks of different part of address space. The direct benefits of spatial separation method is to make the local/edge routing state of network portion of PI address space hidden to the network portion of the PA address space, and thus this directly reduces the number of global routing state of PA network portion of the address space needed to be built and maintained. The negative side of the separation method is that the introduction of the "address space mapping" increases the complexity of the network structure itself, maintenance overhead and communication overhead. It is worth noting that the essence of this method is to reduce the overall number of global routing state needed to be established and maintained rather than a true address aggregation method.

Thirdly, location-based routing. Unlike other methods, this method does not use the network address of the network node, but it uses its location for routing. In the routing system based on geographic location, the network node is assigned with its own location. When the network node 1 sends data to the network node 2, the network node 1 also needs to know where the network location of the current node 2. A network node obtains the location information of other network nodes through internal searching process or external location service. A typical application scenarios for location-based routing method is wireless network environment, which is characterized as follows: firstly, establishment of the route is no longer related with the network topology but the image (or projector) of network topology on geographic map; secondly, the manifestations of routing system scalability change from the complexity of routing table to the complexity of obtaining the service of the node location information; thirdly, the degree of difficulty and complexity of obtaining network node location information are determined by the particle size of location information of the network node and the level of aggregation, in other words, location-based routing method does not solve the scalability problem, but also faces the same scalability issue as the non-location-based routing method essentially in a different form.

It is noted that, in addition to location-based routing, the above methods, which aim at improving the routing scalability of the Internet and use CIDR as a fundamental method for address aggregation without exception, in other words, they are all high-level systems approaches based on the fundamental method. However, from a scalability perspective, CIDR does not have the natural adaptability of the increasing size of hosts, networks of customers and service providers, and the main reason is as follows.

Firstly, CIDR does not have the natural adaptability for the evolution of address assignment of the customer or service provider network. As a core feature of CIDR, focusing on "aggregation of continuous numerical prefix" means CIDR cannot realize the aggregation of several "non-numerical continuous" address prefix. Therefore, for an address allocation institution, CIDR means it can get a good address aggregation effect only if it takes full account of "continuity" of address assignment of the customer or service provider network. The limit brings a significant challenge to the address allocation mechanism, because the size of a client or service provider network usually changes dynamically over time (e.g., expanding), while the customer or service provider usually applies the scale of the size of the address space (someone may consider certain margin) only in accordance with the size of certain network period. Once address allocation mechanism assigns address for a client or service provider's network, it is difficult to predict the address space to which the customer or the service provider's network apply next time, and it is also difficult to set aside "continuous" new address space for them. A typical address allocation strategy taken by Internet regional registries RIR (Regional Internet Registry) is: reserve continuous address space for a subsequent allocation so that the address can continue to be aggregated. Obviously, this strategy reduces the efficient use of address space. Because even we reserve continuous address space, it is difficult to estimate the size of the amount set aside. In short, it is difficult for the address allocation mechanism to ensure the "continuity" of the assigned address for the same customer or service provider's network two or more times, which makes the "continuity" of address aggregation imposed by CIDR and the "discontinuity" of actual address assignment constitutes a pair of irreconcilable contradictions.

Secondly, CIDR does not support the flexibility on the selection of service provider for customers. In order to achieve aggregation of addresses, CIDR must also be based on the address allocation scheme of ISP (Internet Service Provider), and use the so-called address scheme "assigned by providers" (corresponding addresses are called "PA address", Provider Assigned Addresses), that is, customers get their own address from their Service Providers. Thus, from the perspective of the address space, customers' address space is a subset of the address space of the service provider. The advantage of PA address scheme is to ensure the aggregation of continuous addresses, but its obvious disadvantage is that it limits the choice and change customer make to the service provider. For example, when customer networks change their service provider because of service, price, performance, reliability, and other purposes, they need to reconfigure the IP address of all the hosts and network devices of the customer network, that is, they apply for a new address space from their new service provider first, then they configure new address for all hosts and network devices. But the configuration of new addresses for the host and network device may mean a re-configuration or modification of some or all applications running on top of the customer's network, which is called the problem of change the address (Renumbering). A large amount of money, manpower and time costs are required to change the address. And today, customers hope to have sufficient flexibility to choose and change their network service provider and avoid changing their original addresses.

In short, the feature of "continuous aggregation" allows CIDR to aggregate a plurality of numerically discontinuous address prefixes belonging to the same AS into a single prefix. And this feature is an important reason that there is a huge number of routing table entries which are growing rapidly. Thus, CIDR is no longer suitable as an approach based on address aggregation. The invention provides a new method based on address aggregation, i.e., "source address aggregation", which can aggregate plurality of numerically discontinuous address prefix belonging to a single converging AS into a single address prefix.

SUMMARY OF THE INVENTION

In view of the above-described problems, it is one objective of the invention to provide a method of aggregation of the source address bunch.

It is another objective of the invention to provide a network routing system.

The example of this invention is not limited to the specific version of IP protocol, but for the convenience of description, the IPv4 or IPv6 protocols in accordance with the content are selected for description.

1. Terms

Term One: Address Block

A sequence of addresses comprising n continuous network addresses $<a_1, a_2, \ldots, a_n>$ is called an address block, where $a_{i+1}=a_i+1$ ($i=1, 2, \ldots, n-1$), $a_1$ and $a_n$ can be divisible by 2. That is, an address block has continuous addresses with the size of n or $2^k$ ($k=\log n$). For convenience of description, the first address $a_1$ and the last address $a_n$ are named, respectively, as a front and an end, the m higher bits of the front end ($m \leq n$) and the remaining q–m lower bits of zero are called the handle of the block, where q is the length of the address. A block and its handle is similar to an address block and the corresponding prefix. Conceptually a block is equivalent to the address block of the traditional sense, and its handle is equivalent to the corresponding prefix to the address block, so an address block can be expressed in the form <address/mask>, for example, <100.40.15.0/24>.

Any overlap address is not allowed for two different blocks $s_1$ and $s_2$ (i.e., the same address sequence). If the end of $s_1$ is 1 address larger that $s_2$, it's called $s_1$ and $s_2$ are neighboring to each other, otherwise they are not continuous.

In this invention, an address block is called a "source address block," and each address in the address block is called a "source address."

In this invention, the address block is a non-routable identifier, i.e., the address block is not an identifier of routing node for routing algorithms.

Term Two: Address Bunch

A complete set of r linked continuous or discontinuous address block is called an address bunch, in which the first block $s_0$ is called the root block of this Address bunch, the handle of the root block is also called a handle of an address bunch. The link relation of r blocks is specified by a function called "association", see below.

In this invention, an address bunch is called "source address bunch." A source address bunch contains (i.e. aggregation) multiple continuous or discontinuous addresses, and just for this reason, the plurality of address blocks have a common root—their source address bunch.

In this invention, the address bunch is an identifier of routable addresses, i.e., address bunch is used as an identifier of routing node by the routing algorithm.

Term Three: Association

Association is also called address bunch association, which is a function that can link a number of continuous or discontinuous address blocks to each other to form a group of address blocks of complete structure.

Linear and exponential functions can be a simplest association between two address bunches. For example, a linear association of the address bunch B $f^l_B(\bullet)$ can link r address blocks with the same size of n linearly into a whole one:

$$f^l_B(i)=F_0+n\cdot i,\ (i=0,1\ldots,r-1) \quad (1)$$

where $F_0$ and $f^l_B(i)$ denote the first of address bunch and the first of i-th bunch, $f^l_B(i)=F_i$, in addition, the subscript of formula (1) must start from 0, but it does not need to be r–1 continuously. FIG. 1-1 and FIG. 1-2 show linear address bunches with 10 continuous and 7 discontinuous blocks respectively.

Similarly, the exponential association $f^e_B(\bullet)$ can have the following forms:

$$f^e_B(i)=F_0+n\cdot(a^i-1),\ (i=0,1,\ldots,r-1) \quad (2)$$

where a represents the exponential base (for example, a=2), $f^e_B(i)$ represents the front end of the i-th block, the same as linear association, the subscript i in formula (2) must start from 0, but it does not need to be r–1 continuously. FIG. 2-1 and FIG. 2-2 show linear address bunches with 10 continuous exponential values and 7 discontinuous exponential values respectively.

In this invention, an association is called "source association".

In general, IP address, source address block, source address bunch and source association together constitute the foundation of theory of source address aggregation method that the invention provides.

To achieve the above objective, in accordance with one embodiment of the invention, there is provided a method of aggregation of a source address bunch. The method comprises constituting a source address block, associating the source address block to form a source address bunch, and allocating, split, merging, and aggregating the source address bunch.

In a class of this embodiment, the source address block is a sequence of continuous or discontinuous internet addresses having a size of n or $2^k$ ($k=\log n$), n address sequences being $a_1, a_2, \ldots, a_n$, where $a_{i+1}=a_i+1$, $i=1, 2, \ldots, n-1$, $a_1$ to $a_n$ are divisible by 2, and the source address bunch means a complete set of source addresses constituted by r continuous or discontinuous source addresses through link of association, the first source address block $S_0$ is called a root block of the source address block, and a handle of the root block is a handle of the source address bunch, link relations in r blocks of the source address bunch is specified by an associated function, and the association of the source address bunch refers to constitute a function which is capable of linking multiple continuous or discontinuous source address blocks to each other and form a group of source address blocks.

In a class of this embodiment, the association of the source address bunch comprises a linear association and an exponential association. The linear association refers to the linking of source address group of the same size n into a whole one through linear relationship, expressed as $f^l_B(i)$, $f^l_B(i)=F_0+n\cdot i$, $i=0, 1, 2, \ldots, r-1$, where $F_0$ is the front end of the root block of the source address bunch, $f^l B(i)$ is the front end of the root block of the i-th source address bunch; exponential association of the source address bunch refers to the linking of a group of r source address blocks with the same size of n into a whole one through linear relationship, and its expression is $f^e_B(i)$, $f^e_B(i)=F_0+n\cdot(a^i-1)$, $i=0, 1, 2, \ldots, r-1$, a represents a base if $a=2$, $F_0$ represents the front end of root blocks of the source address bunch, $f^eB(i)$ indicates the front end of source address root block of the i-th source address bunch.

In a class of this embodiment, the rule of allocation of the source address bunch is:

1) Any root block of two source address bunches should not be the same;
2) Overlap is allowed between the domains of linear association and exponential association of the source address bunch, and the overlap refers to a non-empty intersection of the sets. Overlap allows the domain of linear association source address bunch to be completely contained in an exponential domain, and also allows the domain of exponential association source address bunch to be completely contained in an linear domain of the source address bunch;
3) There should not be any overlap between two domains of linear association source address bunch;
4) There may be overlaps between domains of two exponential association source address bunch, how the domains overlap follow the rules 5) and 6);
5) Domains of different sizes should be as interleaving and interleaving is not occupied with other source address of address space occupied; and
6) Domain of the same size can overlap.

In a class of this embodiment, the allocation of the source address bunch is in accordance with a best matching rule, which refers to minimizing the difference between the actually-allocated amount and the requested amount, which is expressed mathematically as follow:

$$\mathop{\mathrm{argmin}}_{m}\left\{\sum_{\substack{k=1\\i_k\in I}}^{m} r_{i_k} - n\right\}, I=\{1, 2, \ldots, n\}$$

$$\text{s.t.} \sum_{\substack{k=1\\i_k\in I}}^{m} r_{i_k} \geq n.$$

In a class of this embodiment, the split of the source addresses bunch refers to split a large source address bunch into a number of small source address bunches. According to the number of the source address bunches after split, the source address bunch can be divided into binary split, ternary split, etc., and the general case is w-th (w is a positive integer greater than 1) split, referring to the split into w different source address bunches.

The binary split of linear source address bunch refers to specify a positive integer $p_1$ such that $0<p_1<r-1$ for a linear source address bunch $B=\{F_0+n\cdot i, i=0, 1, 2, \ldots, r-1\}$, and:

$B_1=\{F_0+n\cdot i_1, i_1=0,1,\ldots,p_1-1\}$, $B_2=\{(F_0+n\cdot p_1)+n\cdot i_2, i_2=0,1,\ldots,r-1-p_1\}$.

The ternary split of linear source address bunch refers to specify two positive integers $p_1$ and $p_2$ such that $0<p_1<p_2<r-1$ for a linear source address bunch $B=\{F_0+n\cdot i, i=0, 1, 2, \ldots, r-1\}$, and:

$B_1=\{F_0+n\cdot i_1, i_1=0,1,\ldots,p_1-1\}$, $B_2=\{(F_0+n\cdot p_1)+n\cdot i_2, i_2=0,1,\ldots,p_2-1-p_1\}$, $B_3=\{(F_0+n\cdot p_2)+n\cdot i_3, i_3=0,1,\ldots,r-1-p_2\}$.

Typically, w-th split of linear source address bunch refers to specify w−1 positive integers $p_1, p_2, \ldots, p_{w-1}$ such that $0<p_1<p_2<\ldots<p_{w-1}<r-1$ for a linear source address bunch $B=\{F_0+n\cdot i, i=0, 1, 2, \ldots, r-1\}$, and:

$B_1=\{F_0+n\cdot i_1, i_1=0,1,\ldots,p_1-1\}$, $B_2=\{(F_0+n\cdot p_1)+n\cdot i_2, i_2=0,1,\ldots,p_2-1-p_1\}$,

....

$B_k=\{(F_0+n\cdot p_{k-1})+n\cdot i_k, i_k=0,1,\ldots,p_k-1-p_{k-1}\}$, $2\leq k\leq w-1$

....

$B_w=\{(F_0+n\cdot p_{w-1})+n\cdot i_w, i_w=0,1,\ldots,r-1-p_{w-1}\}$.

The binary split of the exponential source address bunch refers to specify a positive integers $p_1$ such that $0<q_1<r-1$ for an exponential source address bunch $B=\{F_0+n\cdot(2^i-1), i=0, 1, 2, \ldots, r-1\}$, and:

$B_1=\{F_0+n\cdot(2^{i_1}-1), i_1=0,1,\ldots q_1-1\}$, $B_2=\{F_0+n\cdot(2^{q_1+i_2}-1), i_2=0,1,\ldots s-1-q_1\}$.

The ternary split of exponential source address bunch refers to specify two positive integers $p_1$ and $p_2$ such that $0<q_1<q_2<s-1$ for an exponential source address bunch $B=\{F_0+n\cdot(2^i-1), i=0, 1, 2, \ldots, s-1\}$, and:

$B_1=\{F_0+n\cdot(2^{i_1}-1), i_1=0,1,\ldots q_1-1\}$, $B_2=\{F_0+n\cdot(2^{q_1+i_2}-1), i_2=0,1,\ldots q_2-1-q_1\}$, $B_3=\{F_0+n\cdot(2^{q_2+i_3}-1), i_3=0,1,\ldots s-1-q_2\}$.

Typically, w-th split of exponential source address bunch refers to specify w−1 positive integers $p_1, p_2, \ldots, p_{w-1}$ such that $0<p_1<p_2<\ldots<p_{w-1}<r-1$ for an exponential source address bunch $B=\{F_0+n\cdot(2^i-1), i=0, 1, 2, \ldots, s-1\}$, and:

$B_1=\{F_0+n\cdot(2^{i_1}-1), i_1=0,1,\ldots q_1-1\}$, $B_2=\{F_0+n\cdot(2^{q_1+i_2}-1), i_2=0,1,\ldots q_2-1-q_1\}$,

....

$B_k=\{F_0+n\cdot(2^{q_{k-1}+i_k}-1), i_k=0,1,\ldots,q_k-1-q_{k-1}\}$, $2\leq k\leq w-1$

....

$B_w=\{F_0+n\cdot(2^{q_{w-1}+i_w}-1), i_w=0,1,\ldots,s-1-q_{w-1}\}$.

Through multiple split using a binary split iterative method, a large source address bunch is divided into smaller source address bunches with different size to meet the requirement of various levels of subordinate address allocation mechanism; the process of merging multiple source address bunches is an inverse process of split a source address bunch and the merging source address bunch can merge a number of the source address bunches into a large source address bunch. The merge of linear source address bunches accords to the following rules.

For two linear source address bunch $B_1=\{F_1+n\cdot i_1, i_1=0, 1, \ldots, p_1-1\}$ and $B_2=\{F_2+n\cdot i_2, i_2=0, 1, \ldots, p_2-1\}$, if:

$F_2=F_1+n\cdot(p_1-1)$, then the two source address bunches $B_1$ and $B_1$ can be merged into a linear source address bunch $B=\{F_1+n\cdot i, i=0, 1, 2, \ldots, p_2-1\}$.

Two typical types for the merge of exponential source address bunches are provided: splicing merge and containing merge.

The splicing merge refers to splice multiple small source address bunches into a large source address bunch through an iterative method and two small source address bunches:

$$B_1=\{F_1+n\cdot(2^i-1), i=0,1,\ldots,p\},$$

$$B_2=\{F_2+m\cdot(2^j-1), j=0,1,\ldots,q\},$$

If $F_2=F_1+n\cdot(2^{p+1}-1)$, $m=n\cdot 2^{p+1}$, $B_1$ and $B_2$ can be merged into B: $B=\{F_1+n\cdot(2^k-1), k=0, 1, \ldots, p+q+1\}$.

The containing merge refers that the domain of a source address bunch is included in the domain of another source address bunch, and all source address blocks of the former are also the source address blocks of the latter; the two source address bunches are $B_0$ and B, $$B_0=\{F_0+n\cdot(2^i-1), i=0,1,\ldots,u\}, B=\{F+m\cdot(2^j-1), j=0,1,\ldots,v\},$$

If $u>v$ and there exists $x\in\{0, 1, \ldots, u-v\}$ such that: $F=F_0+n\cdot(2^x-1)$, $m=n\cdot 2^x$ established, then the source address bunch $B_0$ contains the source address bunch B, and the source address bunch $B_0$ and B are merged into B.

In a class of this embodiment, the aggregation algorithm of the source address bunch is divided into two parts, firstly, an algorithm expressing the relationship between a specific IP address and a source address bunch containing such an address, which uses association A, exponential base b, filter symbol M, and offset O, where association A specifies whether the type of association is liner association or exponential association, the exponential base b specifies the base value of exponential association, the filter symbol M is operator which first get the first M bit of a bit sequence of m length, M≤m, and right splices (m−M) zeros; the filter symbol M is an arithmetic operation for Address, expressed as: Address/(m−M), offset O specifies the distance between the front end of a source address bunch directly containing a specific IP address and the front end of the root block of a source address bunch which comprises the same source address block. For the linear association, the offset O is the difference between the front end of a source address block which comprises an IP address and the front end of the root block of a source address bunch which comprises the same source address block. For the exponential association, the offset O is the difference between the exponential value of a source address block of a specific IP address and the exponential value of the root block of a source address bunch of the same source address block. Secondly, an algorithm which calculates the handle of a source address bunch which comprises a specific IP address. This algorithm uses specific IP address D, association A, exponential base b, filter symbol M, and the offset O to calculate the handle of a source address bunch which comprises the address D, and use the filter symbol M of D to get $H_s$, the handle of a source address block which comprises D. We get the association type by decoding the association A of address D. For a linear association, let H subtract the offset O and get $H_b$, a handle of a source address bunch which comprises D, For an exponential association, left move (m−M) the offset O of D and get the offset O' according to the filter symbol M of D. Let H subtract O' and get $H_b$, a handle of a source address bunch which comprises D. The above operations of add, subtract, multiply and power are all performed under the meaning of module, and the module is the total number of address.

The invention further provides a network routing system, comprising: a routing structure comprising aggregated source address bunches, the spread of the aggregation of the source address bunches, intra-domain routing based on the source address bunches, inter-domain routing based on the source address bunches, a structure of routing table based on the intra-domain or the inter-domain routing of the source address bunches, a forwarding table of intra-domain or inter-domain routers, a storage form that the source address bunches are stored in the datagram, a creation process of datagram of source address bunch hosts, and a process of forwarding datagram by the intra-domain or the inter-domain routers of the source address bunches.

In a class of this embodiment, the routing structure comprising aggregated source address bunches comprises two types of aggregated routing units: a routing unit based on the source address bunch and a routing unit based on the source aggregation. The routing unit based on the source address bunch described above represents an intra-domain or an inter-domain router based on the source address bunch and its routing and forwarding action are all based on the source address bunch. As a result of an intra-domain or an inter-domain routing, its routing table uses the source address bunch as an exponential to query. It uses the algorithm of the source address bunch to forward the datagram. An inter-domain router based on source address bunch advertise to the other inter-domain router its source address bunch and receive the advertisement of the source address bunch from the other inter-domain router. An inter-domain routing is established through the address of the source address bunch of its own and other inter-domain routers. The routing table also uses the source address bunch as the exponential to query and the router based on the source address bunch uses source address bunch algorithm to forward datagram.

In a class of this embodiment, the routing unit based on source address bunch represents an inter-domain router based on source address bunch with ability of aggregation, and its routing and forwarding actions are all based on source address bunch. Aggregation on non-aggregated source address bunch is called first-order aggregation, and the corresponding source address bunch aggregation routing unit is called first-order aggregation routing unit. Otherwise, they are called high-level aggregation and high-level aggregation routing unit respectively. A routing domain usually transforms multiple source address bunches of its own into less source address bunches through first-order aggregation. There is high-level aggregation implemented by source address bunch aggregation routers of providers routing domain between the routing domains with provider-client relationship, that is, it aggregates the low level source address bunch of customers' routing domain. The router of source aggregation use the algorithm of the source address bunch, a routing domain has at least one routing unit of a source address bunch. As for source address bunch aggregation, a source address bunch aggregation will get multiple smaller source address bunch from intra-domain and outside domain, and aggregates them into a larger one and store the aggregation association. The aggregation of the source address bunch is a kind of forwarding function, which refers to degrading a large source address bunch which the packets received from outside the domain belong to into multiple source address bunches. The same as the router based on source address bunch, a router of source aggregation establishes the intra-domain routing through itself and the other intra-domain routers of the source address bunch. As a result of routing, its routing table uses the source address bunch as an exponential to query. The routing table of the aggregation of the source address bunch router also stores the aggregation relationship between the source address bunch and itself. An inter domain aggregation router based on source address bunch advertises its own source address bunch to the other inter-domain routers. For an inter-domain router based on source address bunch which implements a source address bunch aggregation, it needs to start three operations, first, set the "aggregation symbol identifier" of the routing table entries of this aggregation source address bunch to 1, and set the "aggregation symbol identifier" of the routing table entries of this aggregated source address bunch to 0, and set the "aggregation group identifier" of the routing table entries of this aggregation source address bunch and the routing table entries of this aggregated source address bunch to the identifier of this aggregation group. Second, set the "aggregation group identifier" of forwarding table entries of the aggregation source address bunch to 1 and set "aggregated group identifier" of forwarding table entries of the aggregation source address bunch to 0 thirdly, advertise the whole aggregation, i.e., the multiple source address bunch aggregated and a source address bunch. The inter-domain routers based on the source address bunch also receive advertisement of the source address bunch of other inter-domain routers. As a result of establishment of inter-domain, its routing table uses the source address bunch as exponential of query. The router of the aggregation of the source address bunch uses the same address bunch aggregation algorithm.

The spread of the aggregation of the source address means that, if a domain border router receives a notice of a source address bunch aggregation from another routing domain, it will broadcast the relationship to all hosts and routers in the routing domain.

In a class of this embodiment, the intra-domain routing based on the source address bunch comprises the use of domain routing RIP of existing IP network, OSPF, IS-IS protocols to establish an intra-domain routing domain, the address prefix of original part of network in RIP, OSPF, IS-IS protocol are changed to source address bunch. The network address part of the original address uses the following forms to represent a linear and messages to represent the linear and exponential source address bunch:

The linear source address bunch is described as below:

| 0 | | 31 |
|---|---|---|
| the front end of the root block of the source address bunch | | |
| linear association | the length of source address block | upper-limit |
| length of exceptional list | exceptional list (variable length) | | where the front end of the root block of the source address bunch, the length of source address block, the upper-limit correspond to $F_0$, n and r in the expression (1) of linear association definition described in this invention instruction, linear association indicates that association is linear, and the exceptional list lists the exponential i of source address block that does not belong to that linear source address bunch.

The general form of the exponential source address bunch is as follows:

| 0 | | 31 |
|---|---|---|
| the front end of the root block of the source address bunch | | |
| exponential association | the length of source address block | upper-limit |
| exponential base | | |
| length of exceptional list | exceptional list (variable length) | | where the front end of the root block of the source address bunch, the length of source address block, the upper-limit, exponential base correspond to $F_0$, n, r, and a in the expression (1) of linear association definition described in this invention instruction, exponential association indicates that association is index, and the exceptional list lists the exponential i of source address block that does not belong to that linear source address bunch. If a=2, there is no need to specify exponential base fields, namely:

| 0 | | 31 |
|---|---|---|
| the front end of the root block of the source address bunch | | |
| exponential association | the length of source address block | upper-limit |
| length of exceptional list | exceptional list (variable length) | |

In a class of this embodiment, inter-domain routing method based on source address bunch comprises: using the inter-domain routing BGP of current network to establish inter-domain routes, changing the address prefix of address part in original BGP protocol to source address bunch, in the part of network address in message of BGP protocol using the following form to represent linear and exponential source address bunch respectively:

The linear source address bunch is described as below:

| 0 | | 31 |
|---|---|---|
| the front end of the root block of the source address bunch | | |
| linear association | the length of source address block | upper-limit |
| length of exceptional list | exceptional list (variable length) | | where the front end of the root block of the source address bunch, the length of source address block, the upper-limit correspond to $F_0$, n and r in the expression (1) of linear association definition described in this invention instruction, linear association indicates that association is linear, and the exceptional list lists the exponential i of source address block that does not belong to that linear source address bunch.

The exponential source address bunch is described as follows:

| 0 | | 31 |
|---|---|---|
| the front end of the root block of the source address bunch | | |
| exponential association | exponential association | upper-limit |
| exponential base | | |
| length of exceptional list | length of exceptional list | | where the front end of the root block of the source address bunch, the length of source address block, the upper-limit, exponential base correspond to $F_0$, n, r, and a in the expression (1) of linear association definition described in this invention instruction, exponential association indicates that association is index, and the exceptional list lists the exponential i of source address block that does not belong to that linear source address bunch. If a=2, there is no need to specify exponential base fields, namely:

| 0 | | | 31 |
|---|---|---|---|
| the front end of the root block | | | |
| of the source address bunch | | | |
| exponential association | exponential association | exponential association | |
| length of exceptional list | | length of exceptional list | |

In a class of this embodiment, the router's routing table structure is as follows:

| Identifier of the source address bunch | Route attributes | Others |
|---|---|---|
| source address bunch-1 | ... | ... |
| source address bunch-2 | ... | ... |
| ... | ... | ... |
| source address bunch-n | ... | ... |

Where the identifier of the source address bunch is the handle of the source address bunch, path attributes and others are regular routing table entry fields.

Inter-domain router uses source address bunch to express and establish the inter-domain route based on the running inter-domain protocol, using source address bunch as the exponential of inter-domain routing table to forward the packet, the inter-domain routing table of inter-domain router is divided into two parts of non-aggregation and aggregation. Non-aggregation part comprises entries corresponding to all first-order aggregation source address bunch, each entry of first-order aggregation source address bunch comprises "Identifier of the source address bunch", "route attributes" and "others" attributes. Aggregation part comprises source address bunch entries corresponding to all second-order and higher order aggregation.

The table structure of the inter-domain routing:

| Identifier of the source address bunch | Identifier of aggregation symbol | Identifier of aggregation group | Route attributes | Others |
|---|---|---|---|---|
| Non-aggregation source address bunch-1 | 0 | — | ... | ... |
| Non-aggregation source address bunch-2 | 0 | — | ... | ... |
| ... | | | ... | ... |
| Non-aggregation source address bunch-n | 0 | — | ... | ... |
| aggregation source address bunch-A1 | 1 | A1 | ... | ... |
| aggregated source address bunch-A1 | 0 | A1 | ... | ... |
| ... | | | ... | ... |
| aggregated source address bunch-Am | 0 | A1 | ... | ... |
| aggregation source address bunch-B1 | 1 | B1 | ... | ... |
| aggregated source address bunch-B1 | 0 | B1 | ... | ... |
| ... | | | ... | ... |
| aggregated source address bunch-Bm | 0 | B1 | ... | ... |
| ... | | | ... | ... |
| aggregation source address bunch-Z1 | 1 | Z1 | ... | ... |
| aggregated source address bunch-Z1 | 0 | Z1 | ... | ... |
| ... | | | ... | ... |
| aggregated source address bunch-Zm | 0 | Z1 | ... | ... |

Identifier of aggregation symbol=1, means the corresponding source address bunch is an aggregation source address bunch that has been aggregated locally. The one aggregated is all source address bunch where Identifier of aggregation group has the same value and Identifier of aggregation symbol=1. Identifier of aggregation symbol='0' and Identifier of aggregation group='-', means a source address bunch which is not aggregated locally, that is, a non-aggregation source address bunch.

In a class of this embodiment, forwarding table of the intra-domain or inter-domain router is a concise form of routing tables, which is used to achieve fast packet forwarding, entries in the forwarding table correspond to entries of routing tables one by one, the forwarding table set identifier of the source address bunch, identifier of next hop, output port number, a general structure of the intra-domain forwarding router is as follows:

| Identifier of the source address bunch | Identifier of next hop | Output port number |
|---|---|---|
| source address bunch-1 | ... | ... |
| source address bunch-2 | ... | ... |
| ... | ... | ... |
| source address bunch-n | ... | ... |

The general structure of the forwarding table of the inter-domain router:

| Identifier of the source address bunch | Identifier of aggregation symbol | Identifier of next hop | Output port number |
|---|---|---|---|
| source address bunch-1 | | ... | ... |
| source address bunch-2 | | ... | ... |
| ... | | ... | ... |
| source address bunch-n | | ... | ... |

In a class of this embodiment, the storage form of the source address bunch in the datagram comprises: a source address bunch has four elements of source address, "source IP address", "source association type", "mask" and "offset". There are three fields in "association type", "mask" and "offset" defined for the source and the destination of source address, In order to express the affiliations of the source, the destination IP address to the source address bunch where they are, we store the four elements of source address of an IP address packet in the IP datagram header address field, and the three fields, source address bunch association types, masks and offsets of the destination and the source of IP datagram by-hop extension header.

In a class of this embodiment, the methods and processes of generation of host packet comprise, obtaining the four elements of source address of the source and the destination IP address respectively and fill them in the two parts of IP packet, each source or destination IP address in the host packets comprises four elements: IP address, type of association, mask and offset. The process of the generation of host packet is the process of getting these four elements and filling them in IP packets. There are two sub processes in the acquisition of source address elements. One is querying the name servers and assigning offsets. The host can get domain name, IP address, type of association, mask, and the correspondence between source address bunches, where IP address and mask mean the source address block where they are, source address bunch is the identity of source address block where Ip address locates; the hose aims at obtaining a top source aggregation address bunch of the destination IP address, then it will get the offset between that top source aggregation address bunch to the source address block which comprises the destination IP address; for an IP address, this method will get the source address, association type, mask, and source address bunch, which will be stored in the fields of IP address, association type, mask, and offset of corresponding IP datagrams.

In a class of this embodiment, intra-domain and inter-domain router forwards packets to the host and the process, packet forwarding comprise three sub-functions, which are packets forwarding in the source routing domain, packets forwarding between, routing domains and packets forwarding in the destination routing domain. For packets forwarding of the source and the destination hosts in the same routing domain, there is only one sub-function related to "packets forwarding in the source routing domain", and for packets forwarding of the source and the destination hosts not in the same routing domain, there are three sub-functions described above related, that is, the source host obtains the four elements of the destination host, then it fills the source address bunch of the source and the destination hosts to the IP address fields of the source and the destination IP addresses and by-hop extension header of IP datagram, and at last it sends the datagrams to its connected intra-domain router through the network interfaces, intra-domain router reads the four elements of the destination source address from the destination address and by-hop extension header of the IP datagram. We will get the handle of the source address bunch which comprises the destination IP address by using the algorithm to calculate the handle of the source address bunch, and use the handle of the source address bunch to retrieve keywords and query forwarding tables.

If the router is directly connected to the destination host, the IP packet is sent through the network interface directly connected; if the aggregation symbol identifier of the queried source address bunch B is 0, then send the IP datagrams to the adjacent inter-domain router according to the identifier of the corresponding next hop; if the aggregation symbol identifier of the queried source address bunch B is 1, then for the handle of the source address bunch H(A) which comprises the destination IP address A, find the two adjacent aggregated source address bunches $B_i$ and $B_{i+1}$; $H(B_i) \le H(A) \le H(B_{i+1})$; in the aggregated source address bunches from the queried source address bunches; change the offset of IP address A in IP datagram destination IP address to $H(A)-H(B_i)$, packets forwarding in the destination routing domain, intra-domain reads the four elements of source address from the destination address and by-hop extension header of IP datagrams, and calculate the handle of the source address bunch which comprises the destination IP address with the algorithm which calculate the handle of its source address bunch from a special IP address, and then use the handle of the source address bunch as retrieve keywords to query the forwarding tables; if the router is directly connected to the destination host, it will send the IP datagram from the directly connected network block interface, and forward the IP datagram to the adjacent intra-domain router according to the next hop specified in the queried entries. The intra-domain router of the directly connected host will send the IP datagram to the network block where the destination host locates and the destination host receives and accepts the IP datagrams.

In summary, in the example of this invention, each network autonomous system can apply and obtain one or more source address bunches from a different address allocation mechanism, the difference from CIDR is that, there is no constraint of "continuous addresses reserved for aggregation" when the address allocation mechanism is allocating the source address bunches; the autonomous system which has got the source address bunch through allocation will advertise every source address bunch of its own inside and outside autonomous systems one by one; inter-domain router of autonomous system can aggregate its multiple source address bunches into a source address bunch and then advertise it, before advertisement it will record the aggregation relationship of the corresponding source address bunches; for a intra-domain router in this autonomous system which got the advertisement of a source address bunch, it will establish the route with the source address bunch which replaced the prefix, and in the same time, source address bunch will replace the prefix as retrieve exponential of its own routing table and forwarding table; for a inter-domain router in other autonomous system which got the advertisement of a source address bunch, it will determine a route from itself to the source address bunch according to the route attributes of the source address bunch and its own routing strategy; in addition, the inter-domain router which has got a source address bunch also can aggregate the source address bunch it has received, similarly, it will also record the corresponding source address bunch and advertise the aggregated source address bunch to the other inter-domain router; inter-domain router will also use the source address bunch but not the traditional prefix as exponential to establish its own routing table and forwarding table; every host will use the two processes of domain resolution and aggregation advertisement and get the total four source address bunch elements of each destination IP address; the host will write the four source address bunch elements into the corresponding fields of IP datagrams and send them out; each time an intra-domain or inter domain router gets a packet, it will read the four source address bunch elements of destination IP address and use the aggregation of the source address bunch algorithm to calculate the source address bunch responding to the destination address, then it will use the source address bunch to retrieve the forwarding table and at last it will forward the packet to the router of the next hop.

Advantages of the invention are summarized as follows:
1) The method overcomes the core issue that CIDR with current technology cannot aggregate multiple, discontinuous address block.
2) The method overcomes the issue that part of address space is "idle" which is caused by CIDR with current technology aiming to keep address aggregation by "reserving continuous address space", thus increases the utilization of network address space.
3) The method overcomes the issue the CIDR does not support the flexibility and freedom which allows customers to choose the service provider.
4) The method can make an autonomous system of the network reduce the number of source address block advertised to the global routing system, thereby directly reduce the number of routing entries of routing table and forwarding table of each router in the global routing system.
5) The method helps to relieve the binding constraints of network service providers for customer, allows customers the freedom to use independent PI addresses the network service provider network, and ultimately makes the customer have the autonomy and flexibility in choosing the service provider, and is no longer subject to be troubled by address changes (Renumbering).
6) The method implements the address allocation policy based on source addresses bunch, and the address allocation mechanism does not need to "reserve" continuous address space in advance for an autonomous system in the future, which can improve the efficient use of address space allocation significantly.

BRIEF DESCRIPTION OF THE DRAWINGS

FIG. 1-2 shows a schematic diagram of linear association of discontinuous source address bunch;

FIG. 2-1 shows a schematic diagram of exponential association of continuous source address bunch;

FIG. 2-2 shows a schematic diagram of exponential association of discontinuous source address bunch;

FIGS. 4-1 and 4-2 show flow block diagrams of binary split method of a source address bunch;

DETAILED DESCRIPTION OF THE EMBODIMENTS

To reduce the size of the routing table so as to improve the scalability of Internet routing system, the invention provides a new address aggregation method different from CIDR. To enable persons in this technical field to have a better understanding of the technical solution in the invention, and to make the above objects, features and advantages of this invention more obvious to understand and the following will describe that technical solution in detail with reference to drawings.

Figure 1:
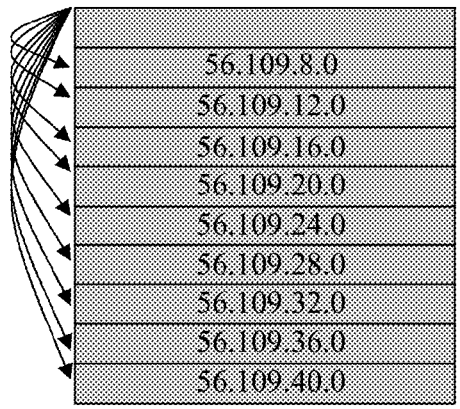
FIG. 1-1 shows a schematic diagram of linear association of continuous source address bunch.
Figures 1, 2:
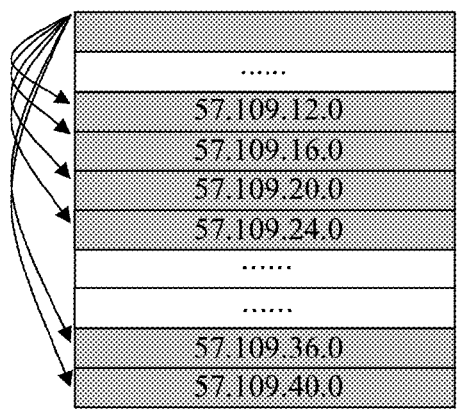
Figures 1, 2:
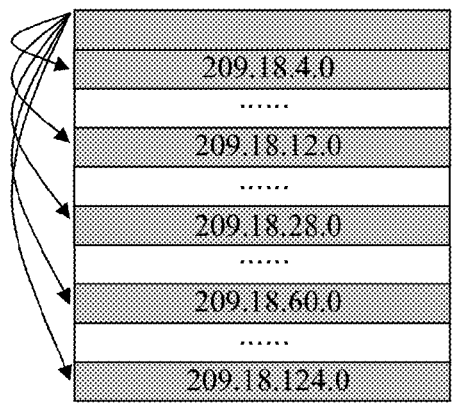
Figure 2:
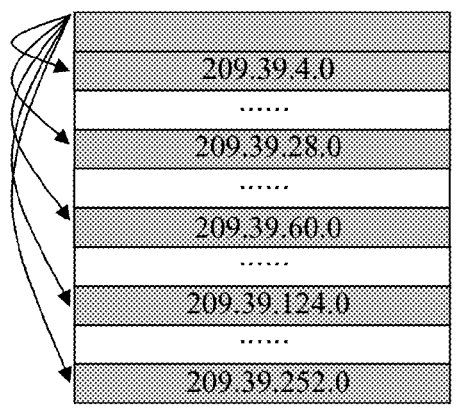

Schematic diagram of the linear association of continuous and discontinuous source addresses bunch is shown in FIG. 1-1 and FIG. 1-2; schematic diagram of the exponential association of continuous and discontinuous source address bunch are shown in FIG. 2-1 and FIG. 2-2.

I. Example of the Allocation Rule of the Source Address Bunch

The difference between this invention and CIDR is: source address bunch rather than address prefix of the address block is used for routing in this invention, so source address bunch also becomes basic unit of addresses that the global Internet address allocation mechanism assign to applicants of IP addresses. When aggregating addresses using CIDR, the address allocation mechanism needs to consider the issue of "continuous address reservation", the result would reduce the usage efficiency of address space. With this invention the address allocation mechanism does not need to consider the issue of "continuous address reservation", so that the efficiency of the address space is no longer affected by address reservation. Because the attribute of the source address bunch is completely different with the prefix, the allocation of the source address bunch needs to follow the following six basic rules:

For linear or exponential allocation of the source address bunch, follow the following two rules:

The first rule: The root of any two different source address bunch should not be the same.

For example, for the linear association, do not define source address bunch $B_1=\{F_0+n\cdot i, i=0, 1, \ldots, r-1\}$ and $B_2=\{F_0+m\cdot j, j=0, 1, \ldots, s-1\}$ as two different linear source address bunches, i.e., the front end of the root block of two different linear source address bunch can not be the same. Similarly, for the exponential association, do not define source address bunch $B_1=\{F_0+n\cdot(2^i-1), i=0, 1, \ldots, r-1\}$ and $B_2=\{F_0+m\cdot(2^j-1), j=0, 1, \ldots, s-1\}$ as different exponential source address bunches.

The second rule: Overlap is allowed in the domains of linear and exponential source address bunch.

Here, the overlap means the intersection of the sets is not empty. As long as no conflicts in the source address block, the domain of a linear source address bunch can be completely comprised in the domain of an exponential source address bunch, and vice versa.

For example, for a linear source address bunch of $B_1=\{F_0+n\cdot j, j=0, 1, 2, 3, 4, 7\}$ and for an exponential source address bunch of $B_2=\{F_0+5\cdot n+n\cdot(2^i-1), i=0, 1, 2, 3, 4, 5, 6, 7\}$, the overlap of the two domains comprise three source address bunches, ie: $\{(F_0+n\cdot k, k=5, 6, 7\}$. As for the exponential source address bunch $B_1=\{F_0+m\cdot(2^i-1), i=0, 1, 2, 3, 4\}$, and the linear source address bunch $B_2=\{(F_0+m\cdot2^3)+m\cdot j, j=0, 1, 2, 3, 4, 5, 6, 7\}$, and the domain of $B_2$ is completely comprised in the domain of $B_1$.

For the allocation of the source address bunch, follow the following rule:

The third rule: There should not be any overlap between the domains of two linear source address bunches.

A typical application of linear source address bunch is to fill the "blank area" in the domain of exponential source address bunches, therefore, the domain of the linear source address bunch is usually smaller, the requirement of setting up non-overlap area is to simplify the relationship between the linear source address bunches, which is beneficial for the allocation and the use of the linear source address bunch.

For example, for a linear source address bunch $B_1=\{F_0+n\cdot i, i=0, 1, 2, 3, 4, 5, 6, 7\}$ and $B_2=\{(F_0+8\cdot n)+n\cdot j, j=0, 1, 2, 3, 4, 5, 6, 7\}$, there is no overlap between the two domains, and for $B_3=\{F_0+m\cdot i, i=0, 1, 2, 3, 4, 5, 7\}$ and $B_4=\{(F_0+6\cdot m)+m\cdot j, j=0, 2, 3, 4, 5, 6, 7\}$, as the two domains comprise two identical linear source address bunches, namely: $\{F_0+$ m·k, k=6, 7}, and therefore it violates rule three, therefore, the definition of $B_3$ or $B_4$ should be eliminated.

For allocation of exponential source address bunch, follow the following two rules:

The fourth rule: There can be overlap between the domains of the two exponential source address bunch, but the method of overlap should follow the rule five and rule six.

The fifth rule: Domains of different size should be intertwined as possible.

Here, being intertwined refers to the address space not occupied by other bunch of source address block.

For example, the domain of a larger exponential source address bunch $B_1=\{F_0+n\cdot(2^i-1), i=0, 1, 2, 3, 4, 5, 6, 7, 8, 9\}$ comprises a large "blank area", so you can define several other smaller exponential source address bunch $B_2=\{(F_0+n\cdot2^4)+n\cdot(2^j-1), j=0, 1, 2, 3\}$, $B_3=\{(F_0+n\cdot2^5)+n\cdot(2^k-1), k=0, 1, 2, 3, 4\}$, $B_4=\{(F_0+n\cdot2^6)+n\cdot(2^p-1), p=0, 1, 2, 3, 4, 5\}$, $B_5=\{(F_0+n\cdot2^7)+n\cdot(2^q-1), q=0, 1, 2, 3, 4, 5, 6\}$ and $B_6=\{(F_0+n\cdot2^8)+n\cdot(2^r-1), r=0, 1, 2, 3, 4, 5, 6, 7\}$.

The sixth rule: There can be part overlap of two identical size.

For example, the exponential source address bunch $B_1=\{F_0+n\cdot(2^i-1), i=0, 2, 3, 4, 5, 6, 7, 8\}$ and $B_2=\{(F_0+n)+n\cdot(2^j-1), j=0, 2, 3, 4, 5, 6, 7, 8\}$ have domains of the same size; the two domains are overlap almost completely, i.e.; there is only address space corresponding to a root source address block in the domain of each source address bunch, and the rest is completely the same. Similarly, you can define $B_3=\{(F_0+2\cdot n)+n\cdot(2^k-1), k=0, 2, 3, 4, 5, 6, 7, 8\}$ such that the domains of three identical exponential source address bunch, $B_1$, $B_2$ and $B_3$, are partly overlapped.

II. Example of the Matching Rule of the Allocation of the Source Address Bunch

Based on following the above six rules, we need to consider the best matching problem between the actual allocation and assignment request. The so-called best matching refers to the minimal difference between the amount of actual allocation and the amount of assignment request. For simplicity, we assume that there are h source address bunches in the address pool of the address allocation mechanism, and these bunches have the same size of z, so the total number of allocated addresses is $z\cdot\Sigma^h_{i=1}r_i$, where $r_i$ is the amount of source address blocks of the source address bunch $B_i$. For a request that need n source address blocks, it is to minimize the difference between the actual source address blocks comprised in the actual allocation of m (m<h) source address bunches and the source address blocks needed. In general, the best match is equivalent to the following optimization problem.

$$\operatorname*{argmin}_{m}\left\{\sum_{\substack{k=1\\i_k\in I}}^{m}r_{i_k}-n\right\}, I=\{1,2,\ldots,h\} \quad (3)$$

$$\text{s.t.} \sum_{\substack{k=1\\i_k\in I}}^{m}r_{i_k}\geq n$$

Figure 3:
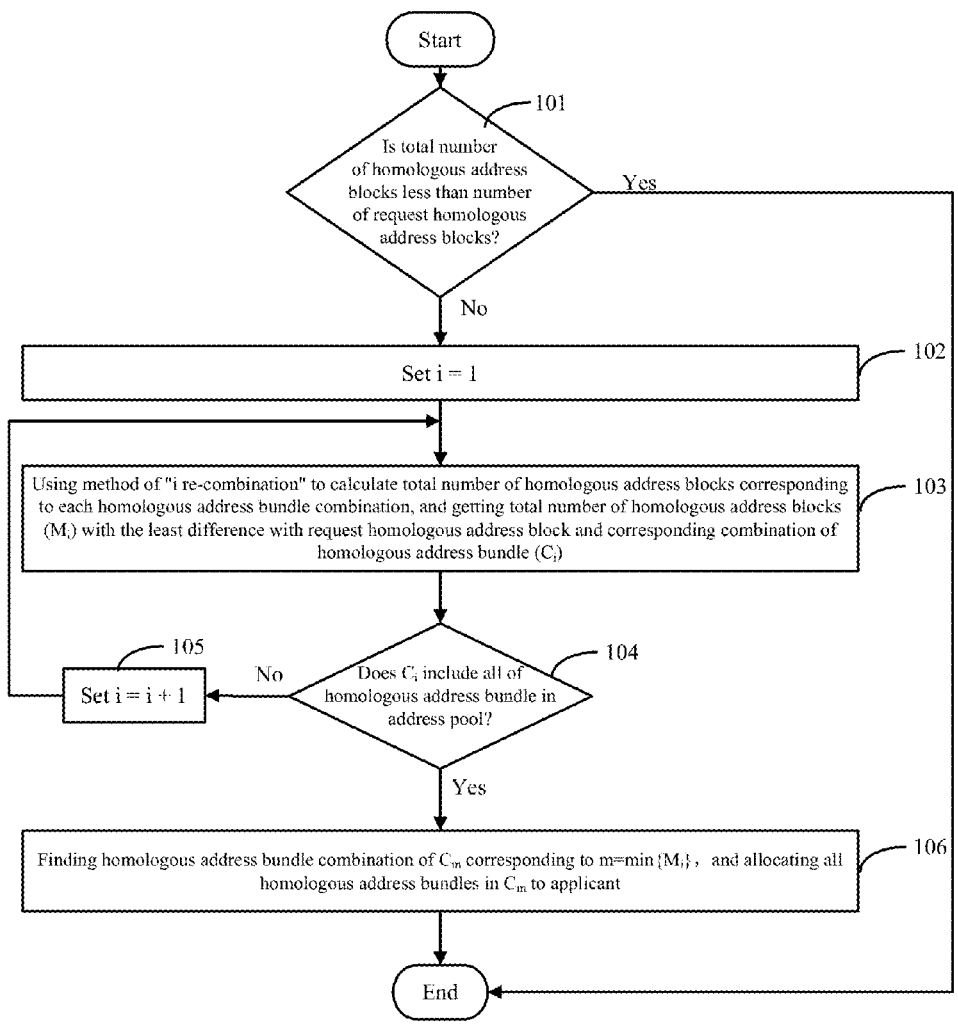
FIG. 3 shows a flow block diagram of the best matching rule of a source address bunch.

Specifically, see FIG. 3, the address allocation mechanism uses the above best match method to finish address assignment through the following steps:

Step 101: If the total number of source address blocks of all the source address bunches is less than the number of source address blocks, then the address request is rejected, the end; otherwise, go to step 102.

Go to step 102: Set i=1, go to step 103.

Step 103: We use the method of "i re-combination" to calculate the total number of the source address blocks corresponding to each source address bunch combination, and get the total number of source address blocks with the least difference with the request source address block and the corresponding combination of the source address bunch. Assume that the combination of the source address bunch and the number of source address block as $C_i$ and $M_i$ respectively, go to step 104.

Step 104: If the current "i re-combination" comprises all of the source address bunch in the address pool, go to step 106, otherwise, go to step 105.

Step 105: set i=i+1, go to step 103.

Step 106: Find the source address bunch combination of $C_m$ corresponding to m=min{$M_i$}, and allocate all source address bunches in $C_m$ to the applicant, the end.

Here is an example of the best match. Assuming there are five source address bunches in the address pool of an allocation agency: $B_1$, $B_2$, $B_3$, $B_4$ and $B_5$, the source address blocks they comprise are 10, 20, 30, 40 and 50, respectively. If another smaller address agency $A_1$ for 100 source address blocks form $A_0$, $A_0$ will assign $B_2$, $B_3$ and $B_4$ to $A_1$, because such assignment can make the difference between the requested 100 source address blocks and the sum of rank $r_2$, $r_3$, $r_4$, the least.

III. Example of Split of the Source Address Bunches

Divisive assignment of the source address bunches can make the address allocation mechanism finish the allocation in a more flexible way. In particular, through division of the source address bunch, a large address allocation mechanism can decompose a large source address bunch in to a number of smaller source address bunches, then assign these smaller source address bunches to smaller allocation mechanism or ISP. The expression about the divisive rules of linear source address bunch and exponential source address bunch is given in the above "III. Invention" and here is the specific implementation process.

Figures 1, 4:
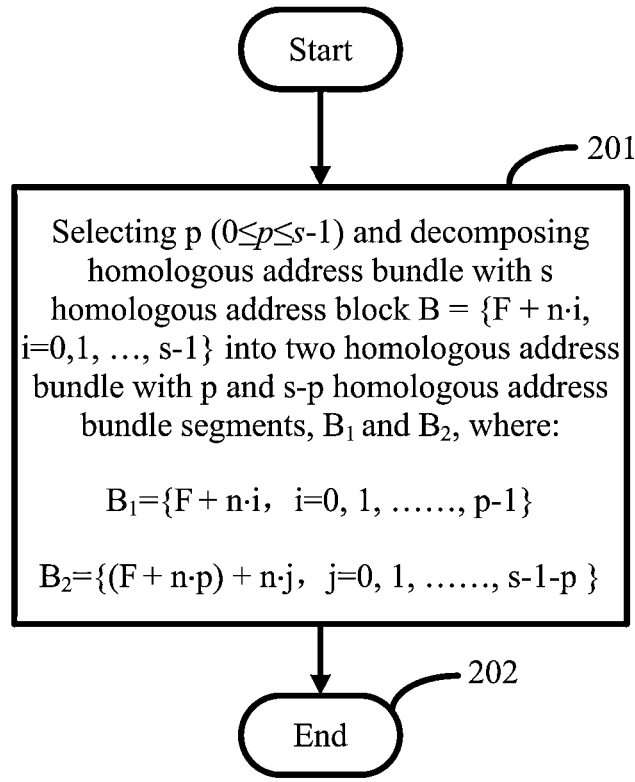
Figures 2, 4:
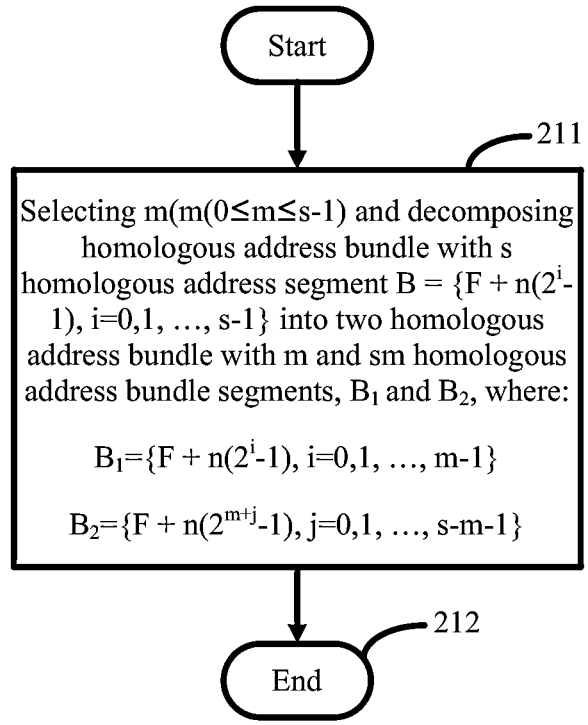

Referring to FIG. 4-1, the binary divisive method of linear source address bunch is executed through the following steps:

Step 201: For a source address bunch with s source address block B={F+n·i, i=0, 1, . . . , s−1}, you can select a positive integer p (0≤p≤s−1) and decompose it into two source address bunch with p and s−p source address bunch blocks, $B_1$ and $B_2$, where:

$B_1=\{F+n\cdot i,\ i=0,1,\ldots,p-1\}$ $B_2=\{(F+n\cdot p)+n\cdot j,\ j=0,1,\ldots,s-1-p\}$ Step 201: End.

Referring to FIG. 4-2, the binary divisive method of exponential source address bunch is executed through the following steps:

Step 211: For a source address bunch with s source address block B={F+n·($2^i$−1), i=0, 1, . . . , s−1}, you can select m (0≤m≤s−1) and decompose it into two source address bunch with m and s−m source address bunch blocks, $B_1$ and $B_2$, where:

$B_1=\{F+n\cdot(2^i-1),\ i=0,1,\ldots,m-1\}$ $B_2=\{F+n\cdot(2^{m+j}-1),\ j=0,1,\ldots,s-m-1\}$ Step 212: End.

Obviously, you can decompose a large source address bunch several times with an iterative binary division method and then assign the decomposed smaller source address bunches with different size to the lower small bunch source addresses assigned to the various levels of the lower address allocation mechanism. Similarly, we can get the specific implementation process of.

IV. Example of Merging of the Source Address Bunch

The process of merge of source address bunch is the inverse process of split of source address bunch. Similar with the prefix aggregation in CIDR, the merge of source address bunch merges multiple small source address bunch into a large source address bunch. Because the merge of linear source address bunch is very simple, and here just consider the case for exponential source address bunch.

There are two typical types for the merge of source address bunch, namely splicing merge and containing merge. On the other hand, each merge of source address bunch is required to meet specific conditions. Splicing merge refers to merging multiple small source address bunches into a large source address bunch. Specifically, for two source address bunches $B_1=\{F_1+n\cdot(2^i-1), i=0, 1, \ldots, p\}$ and $B_2=\{F_2+m\cdot(2^j-1), j=0, 1, \ldots, q\}$, if the condition is satisfied:

$$F_2=F_1+n\cdot(2^{p+1}-1)$$

$$m=n\cdot 2^{p+1}$$

Then $B_1$ and $B_2$ can be merged into a larger source address bunch B: $B=\{F_1+n\cdot(2^k-1), k=0, 1, \ldots, p+q+1\}$. Obviously, the splicing merge can merge multiple small source address bunches into a single large source address bunch through an iterative method.

Figure 5:
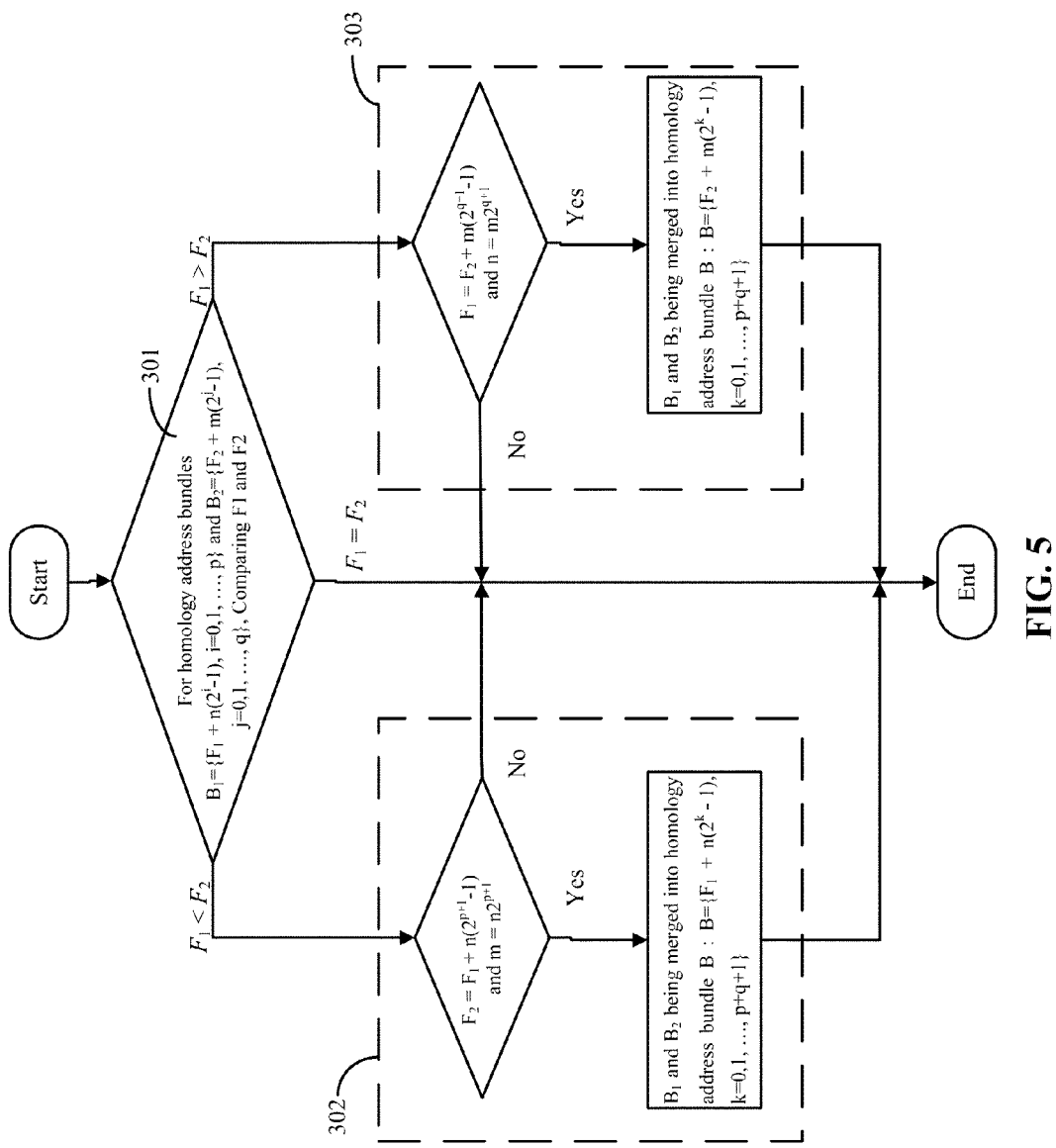
FIG. 5 shows a flow block diagram of splicing merge of a source address bunch.

Referring to FIG. 5, the splicing merge of exponential source address bunch is achieved through the following steps:

Step 301: For two source address bunches $B_1=\{F_1+n\cdot(2^i-1), i=0, 1, \ldots, p\}$ and $B_2=\{F_2+m\cdot(2^j-1), j=0, 1, \ldots, q\}$. If $F_1<F_2$, perform step 302; if $F_1>F_2$, perform step 303; if $F_1=F_2$, $B_1$ and $B_2$ can not be splicedly merged, end.

Step 302: If $F_2=F_1+n\cdot(2^{p+1}-1)$ and $m=n\cdot 2^{p+1}$, $B_1$ and $B_2$ can be splicedly merged into a source address bunch $B=\{F_1+n\cdot(2^k-1), k=0, 1, \ldots, p+q+1\}$, or, $B_1$ and $B_2$ can not be splicedly merged, end.

Step 303: If $F_1=F_2+m\cdot(2^{q+1}-1)$ and $n=m\cdot 2^{q+1}$, $B_1$ and $B_2$ can be splicedly merged into a source address bunch $B=\{F_2+m\cdot(2^k-1), k=0, 1, \ldots, p+q+1\}$, or, $B_1$ and $B_2$ can not be splicedly merged, end.

Containing merger refers to the domain of a source address bunch comprised in the domain of another source address bunch, and all source address blocks of the former are also source address blocks of the latter. Specifically, for two source address bunches $B_0=\{F_0+n\cdot(2^i-1), i=0, 1, \ldots, u\}$ and $B=\{F+m\cdot(2^j-1), j=0, 1, \ldots, v\}$, if u>v and there exists $x\in\{0, 1, \ldots, u-v\}$ such that:

$$F=F_0+n\cdot(2^x-1)$$

$$m=n\cdot 2^x$$

If established, the source address bunch $B_0$ comprises source address bunch B, that is, source address bunches $B_0$ and B can be merged into B.

Figure 6:
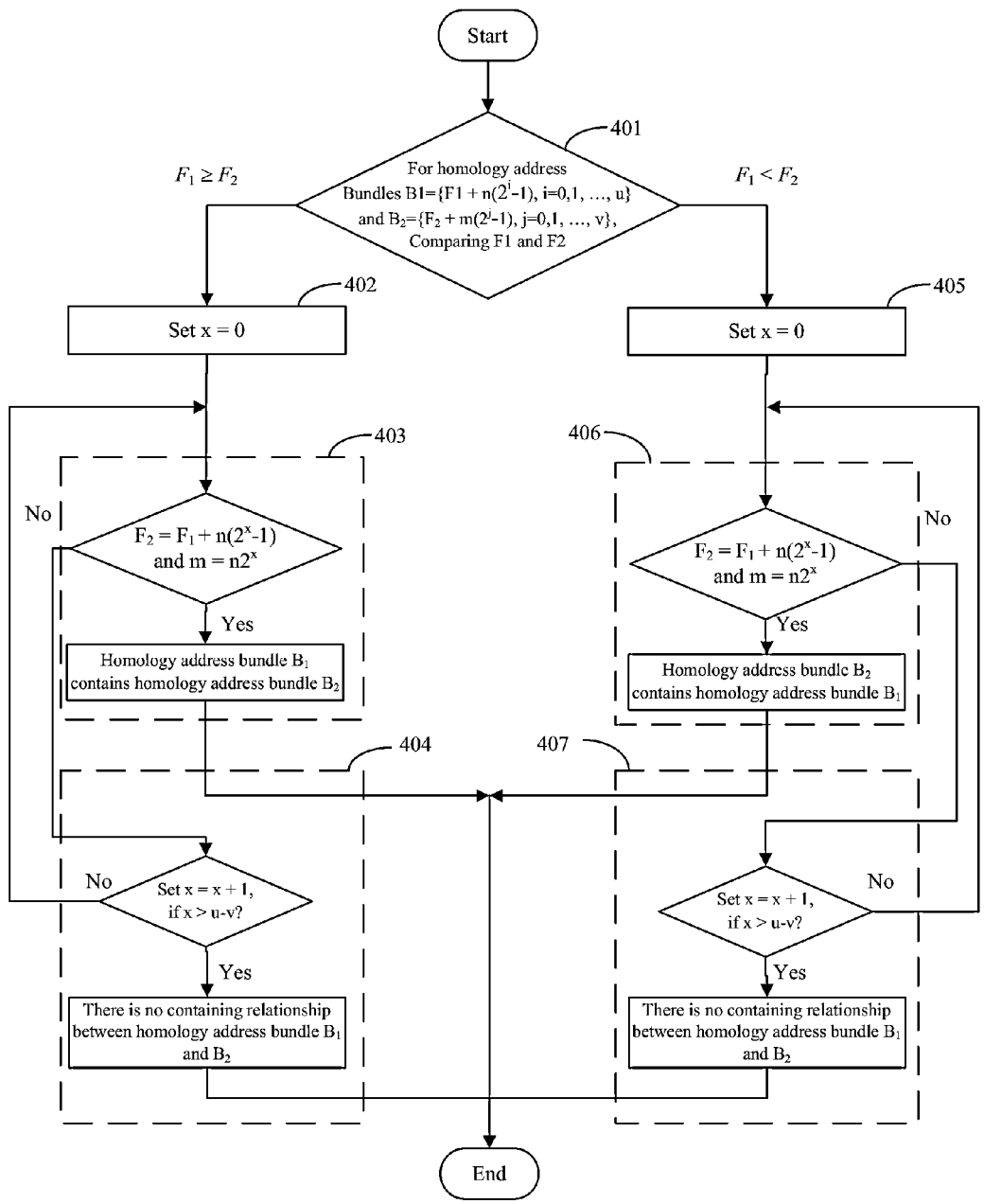
FIG. 6 shows a flow block diagram of containing merge of a source address bunch.

Referring to FIG. 6, the merge of exponential source address bunches is achieved through the following steps:

Step 401: For the two source address bunches $B_1=\{F_1+n\cdot(2^i-1), i=0, 1, \ldots, u\}$ and $B_2=\{F_2+m\cdot(2^j-1), j=0, 1, \ldots, v\}$. If $F_1\geq F_2$, go to step 402; if $F_1<F_2$, go to step 405.

Step 402: Set x=0.

Step 403: If $F_2=F_1+n\cdot(2^x-1)$ and $m=n\cdot 2^x$, the source address bunch $B_1$ comprises source address bunch $B_2$, end, and else go to step 404.

Step 404: Set x=x+1, if x>u−v, there is no comprising relationship between source address bunch $B_1$ and $B_2$, end, otherwise, go to step 403.

Step 405: Set x=0.

Step 406: If $F_1=F_2+m\cdot(2^x-1)$ and $n=m\cdot 2^x$, then source address bunch $B_2$ comprises source address bunch $B_1$, end, or go to step 407.

Step 407: Set x=x+1, if x>u−v, there is no comprising relationship between source address bunch $B_1$ and $B_2$, otherwise, go to step 406.

The spliced merge and containing merge of source address bunches can be directly used for the operation of the aggregation of source address bunches intra-domain and inter-domain routers, that is, the merged source address bunch is used as an aggregation source address bunch, and then store the corresponding relationship of the merged source address bunch and the aggregation source address bunch, and finally, advertise the aggregation source address bunch to other intra-domain and inter-domain routers.

V. Source Address Bunch Aggregation Algorithm, Namely Example of Discontinuous Prefix Address Aggregation Algorithm The core of this invention is the address aggregation of discontinuous prefix, we call this address aggregation algorithm "source address aggregation algorithm".

This invention introduces new core functional elements for non-aggregation, namely "source address block", "address prefix association" and "source address bunch", where address prefix association can map multiple discontinuous address prefix segment to a corresponding address prefix block group; (the aggregated prefix block is called "source prefix slice", any address comprised in "source address bunch" is called "source address").

Source address aggregation algorithm is divided into two parts, namely, "to express the relationship between a specific IP address and source address bunch which comprises it" and "to calculate the handle of a source address bunch which comprises a specific IP address with the IP address". The algorithm which expresses the relationship between a particular IP address and the source address bunch which comprises it, uses association A, exponential base b, filter symbol M, and offset O to indicate the relationship between a specific IP address and source address bunch B which comprises the IP, where the association A indicates the type of association (i.e., the linear association or exponential association); exponential b specifies the base value of exponential association; filter operator M makes the first M bits of a sequence of length m(M≤m) right splice (m−M) symbols of zero, since the filter operator M is an operation to Address, so it can be expressed as: Address/(m−M), for example, 100.40.35.12/22=100.40.32.0/22; offset O specifies directly the distance between the front end of a source address block of a specific IP address and the front end of the root of the source address bunch which comprises this source address block. This distance has different meanings in the linear association or exponential association. The detail of step 504 and step 508 of the algorithm is described below.

Figure 7:
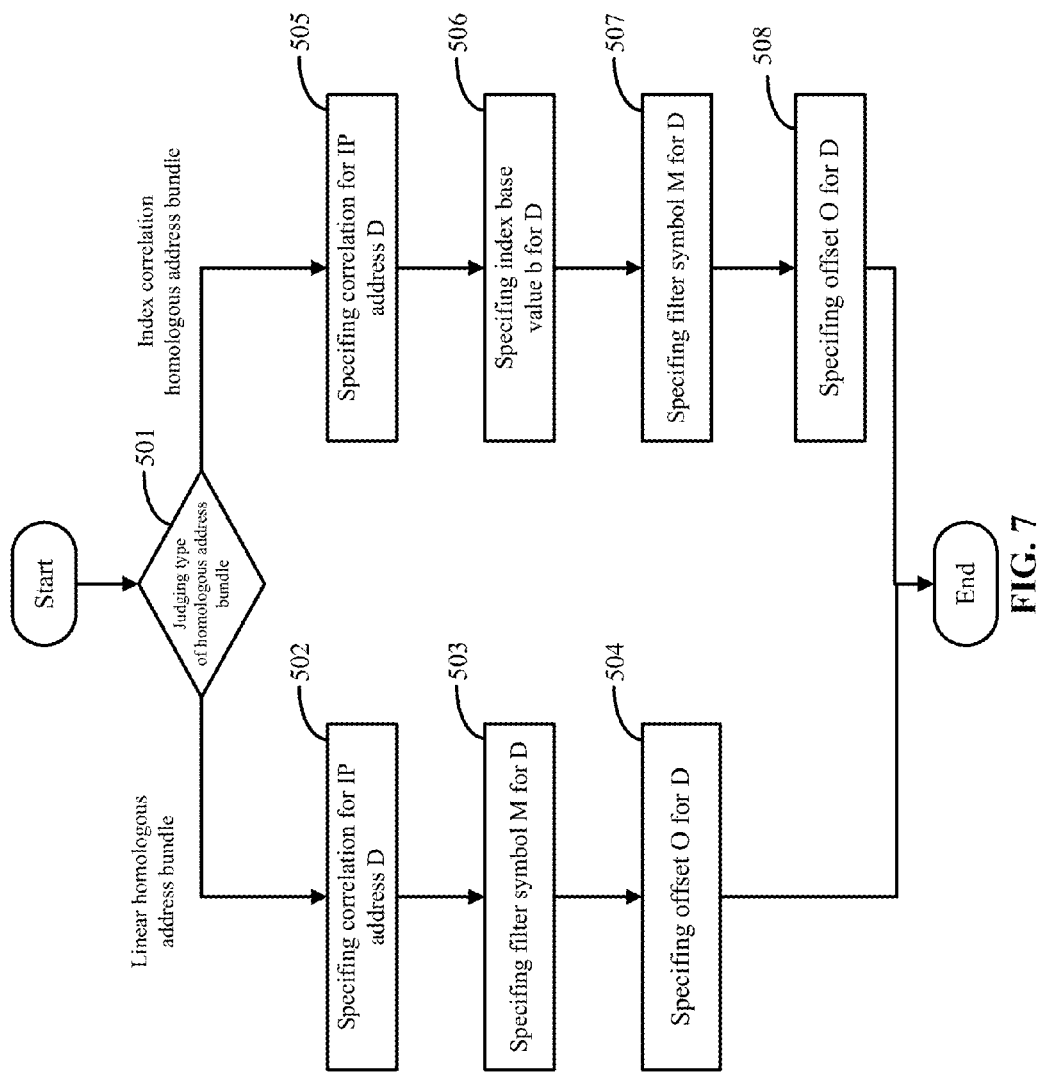
FIG. 7 shows a flow block diagram of the algorithm of relations between an address of source address and the source address bunch which comprises it.

Referring to FIG. 7, the algorithms to calculate the relationship between any of the IP address D in the address range of expression [100.40.32.0, 100.40.35.255] (for example, let D=100.40.35.12) and the source address bunch B which comprises it (for example, the handle of B is set to 100.40.20.0/22) is performed in these following steps:

Step 501: For the case of the linear source address bunch, go to step 502; for the case of the exponential association source address bunch, go to step 505.

Step 502: Specify the association for IP address D, for example, set A=1.

Step 503: Specify the filter M for the D, e.g. set M=100.40.32.0/22.

Step 504: Specify offset O for D, for example, set O=3072 (Note: For a linear association, the offset O is the difference between the front end of a source address block of a specific IP address and the front end of the root of a source address bunch which comprises the source address block), the end.

Step 505: Specify the association for IP address D, for example, set A=2.

Step 506: Specify the exponential base value for D, for example, set b=2.

Step 507: Specify the filter symbol M for D, e.g. set M=100.40.32.0/22.

Step 508: Specify offset O for D, for example, set O=3 (Note: For the exponential association, the offset O is the difference between the exponential power value of a source address block of a specific IP address and the exponential power value of the root of a source address bunch which comprises the source address block), the end.

Figure 8:
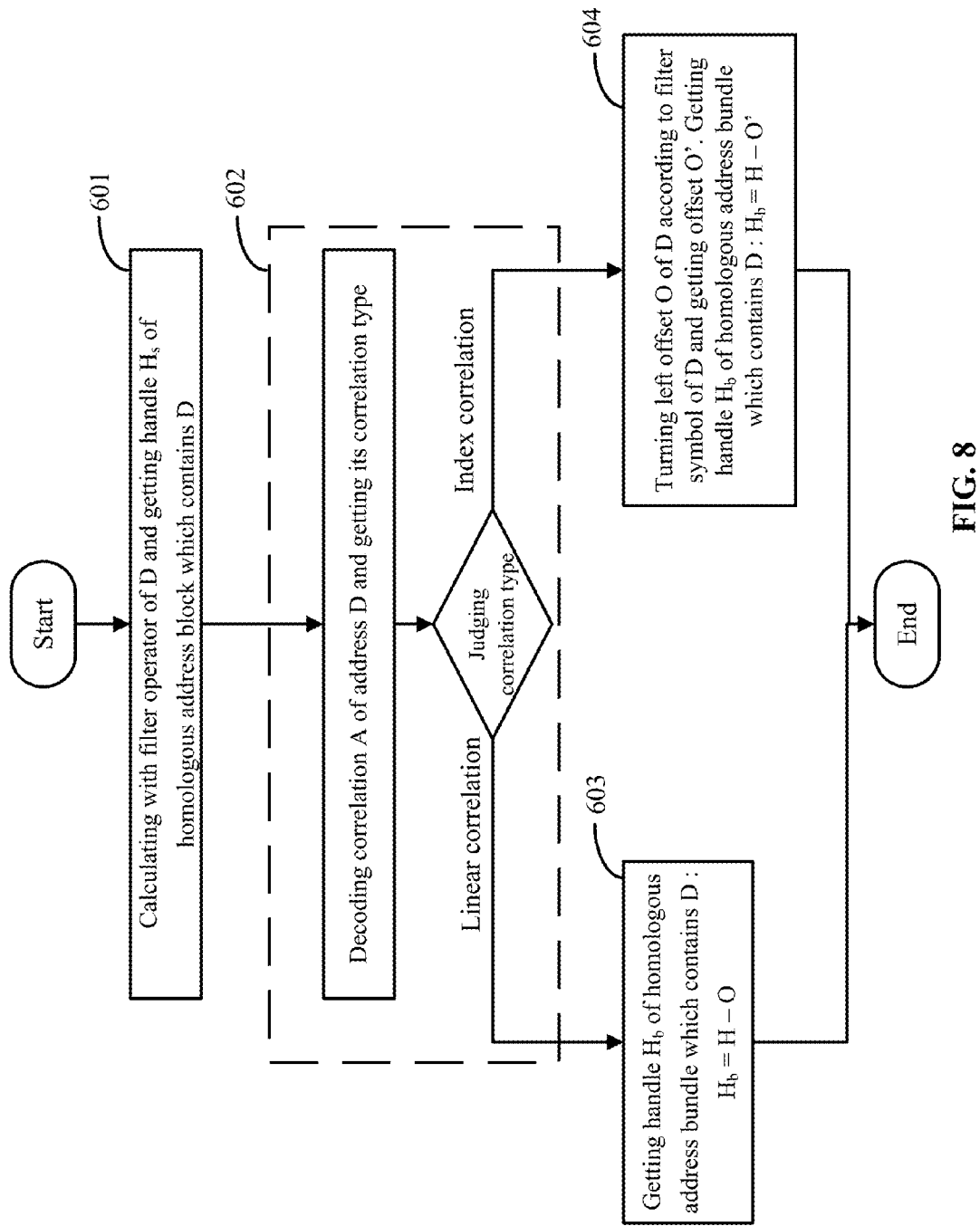
FIG. 8 shows a flow block diagram of the algorithm which a source address uses to calculate the handle of a source address bunch which comprises the address.

The algorithm which calculates the handle of a source address bunch which comprises a specific IP address with the address, will use specific IP address D, association A, exponential base b, filter operator M, and offset O to calculate the handle of the source address bunch which comprises address D. Referring to FIG. 8, the algorithm which calculates the handle of the source address bunch B which comprises it with any of the IP address D in the address range of expression [100.40.32.0, 100.40.35.255] (for example, let D=100.40.35.12) is performed in these following steps:

Step 601: Calculate with filter operator of D and get the handle $H_s$ of a source address block which comprises D, and for D=100.40.35.12, there exists $H_s$=100.40.32.0/22.

Step 602: Decode association A of address D and get its association type, for a linear association go to step 603, and for an exponential association, go to step 604.

Step 603: Subtract the offset O of D from H and get the handle $H_b$ of a source address bunch which comprises D, for example, $H_b$=100.40.32.0−3072=100.40.20.0, the end.

Step 604: Turn left the offset O of D according to the filter symbol of D and get the offset O', subtract O' from H and get the handle $H_b$ of a source address bunch which comprises D, for example, $$H_b=100.40.32.0-2^{32-22}\times(2^2-1)=100.40.32.0-2^{10}\times 3=100.40.20.0, \text{the end.}$$

It should be noted that the above operations of addition, subtraction, multiplication, power are performed under the meaning of modulo, and the mold is the total number of addresses.

VI. Example of Routing Structure of the Source Address Bunch

Figure 9:
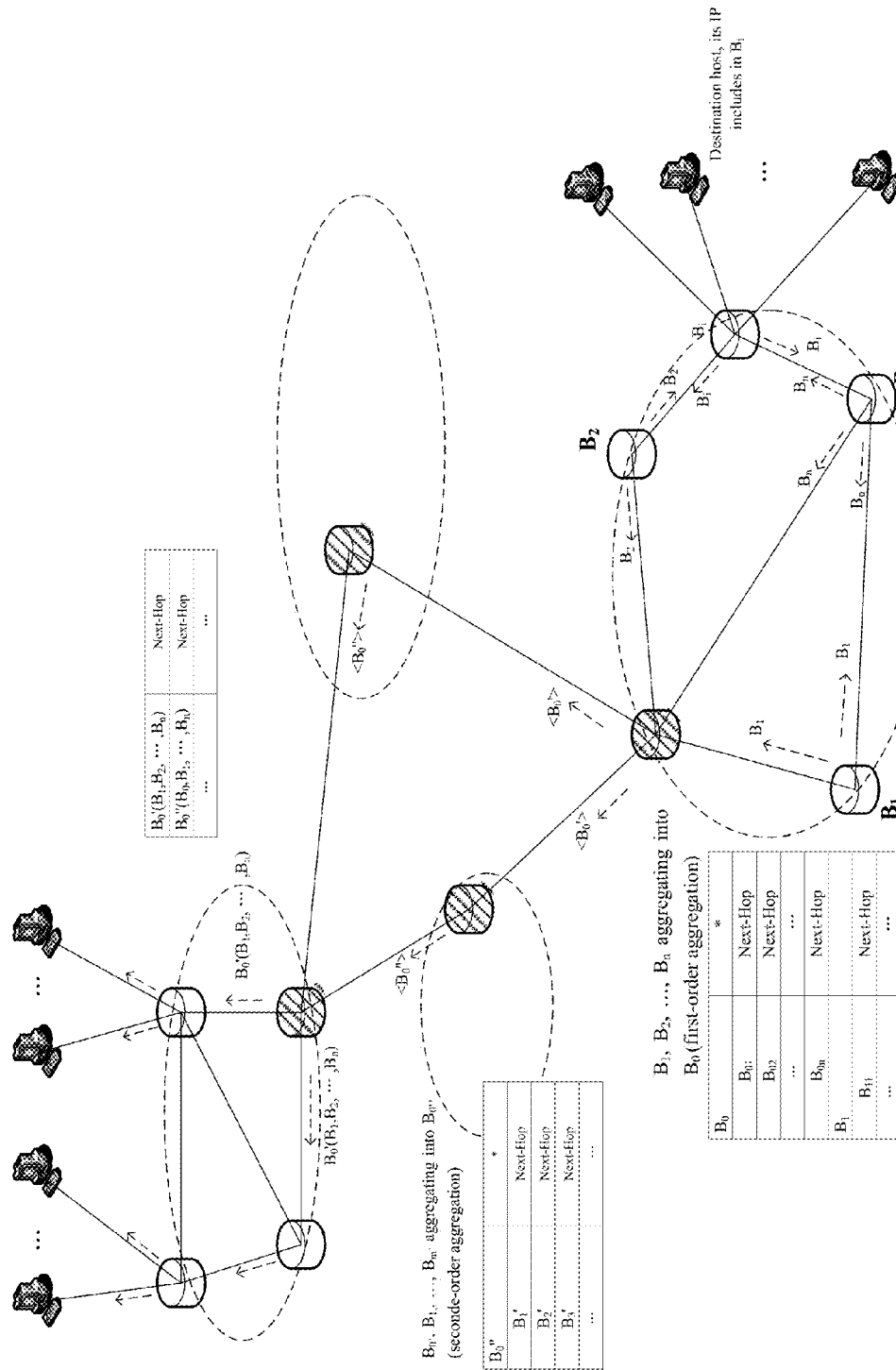
FIG. 9 shows a schematic diagram of the routing structure of the network routing system of source aggregation.

In general, the source aggregation routing structure achieves the function of route choice based on source address bunch rather than traditional prefix, which consists of three functional units, referring to FIG. 9, and the functions are described below respectively.

1) Routing Unit Based on Source Address Bunch

Routing unit based on source address bunch represents an intra-domain or inter-domain router based on a source address bunch, and both of its actions of routing and forwarding are based on source address bunches. These kind of units do not have the function of aggregating source address bunches, so they are also called "zero-order" source address bunch aggregation routing units. An intra-domain router based on source address bunch can establish an intra-domain route through itself and source address bunch of the other intra-domain router, and as a result of route choice, the routing table use source address bunch as the exponential for query. An inter-domain router based on source address bunch advertise its own source address bunch to the other inter-domain routers and receive advertise of the source address bunch from the other inter-domain router, and establish inter-domain route between source address bunch of the other router and itself, as a result, its routing table also use source address bunch as exponential for query.

Routers based on source address bunch use the aggregation algorithm of the source address bunch (see example of source aggregation algorithm) to forward packets.

2) Routing Unit Based on Source Aggregation

Routing unit based on source address bunch represents an inter-domain router based on source address bunch with the aggregation function (this invention sets aside the consideration of intra-domain router based on source aggregation, that is, intra-domain routers do not aggregate the source address bunches), its routing and forwarding behavior are based on source address bunch, if the aggregation is performed on source address bunch which is not aggregated, it is called "first-order aggregation", and the corresponding source address bunch routing unit is called "first-order aggregation routing unit"; otherwise, they are referred as "high-order aggregation" and "high-order aggregation routing unit." A routing domain usually transforms its own multiple source address bunch to fewer source address bunch which are "visible" externally. In the routing domains of "provider-client", high-order aggregation is usually provided by the source address bunch router of provider's routing domain, i.e., it aggregates low-order source address bunch of customer's routing domain. Source aggregation routers also use the algorithm of the source address bunch (see example of source aggregation algorithm) to implement aggregation.

A routing domain has at least one routing unit of the source address bunch. For the aggregation of the source address bunch, an aggregation router of the source address bunch has two specific functions of aggregation and disaggregation of the source address bunch, and it also has two function roles of intra-domain and inter-domain. The aggregation of the source address bunch is a kind of routing function, referring to aggregating multiple "small" source address bunches received from intra-domain and inter-domain into a "large" source address bunch and stores that aggregation relationship. Disaggregation of the source address bunch is a kind of forwarding function, referring to degrading a large source address bunch of a packet received outside the domain to multiple small source address bunches.

The same as routers based on source address bunch, a source aggregation router can establish intra-domain route through itself and source address bunch of the other routers. As a result of route choice, its routing table use source address bunch as the exponential for query. Different from routers based on source address bunch, routing tables of source aggregation router also record the aggregation relationship of the source address bunch. An inter-domain router based on source address bunch advertises its own source address bunches to routers in the other domains. For an inter-domain router based on source address bunch of a source address bunch aggregation, it needs to start three operations, firstly, set the "aggregation symbol identifier" of routing table entries of this aggregation source address bunch to 1, and set the "aggregation symbol identifier" of routing table entries of this aggregated source address bunch to 0, and set the "aggregation group identifier" of this aggregation source address bunch and the "aggregation group identifier" of this aggregated source address bunch to identifier of this aggregation group; secondly, set the "aggregation symbol identifier" of forwarding table entries of this aggregation source address bunch to 1, and set the "aggregation symbol identifier" of forwarding table entries of this aggregated source address bunch to 0; thirdly, advertise the total aggregation relationship (that is, multiple aggregated source address bunch and an aggregation source address bunch) outside. Inter-domain router based on source address bunch also receives advertisement of the source address bunch from routers of the other domains. As a result of establishment of inter-domain routing, the routing table also uses source address bunch as exponential for query.

Aggregation routers of the source address bunch also use the aggregation algorithm of the source address bunch to implement the forwarding of packets.

3) Routing Mechanism

The core of routing mechanism of the source address bunch routing structure is based on source address bunch. It is divided into two parts of intra-domain and inter-domain routing, and the current intra-domain and inter-domain routing mechanism can be used directly for source aggregation routing structure. Since the aggregation based on source address bunch given in this invention is completely different from the traditional aggregation based on address prefix, there needs minor modification of current intra-domain and inter-domain routing protocols for the routing structure of source aggregation.

For aggregation routing structure source domain routing, you can use existing protocols, such as, RIP, OSPF, IS-IS, etc., but the agreement is no longer the traditional message carrying the address prefix but source Address bunch. For inter-domain routing, you can still use the existing BGP protocol, BGP, however, and address the message shall bring source bunch instead address prefix.

4) Example of Aggregation Spreading

Figure 10:
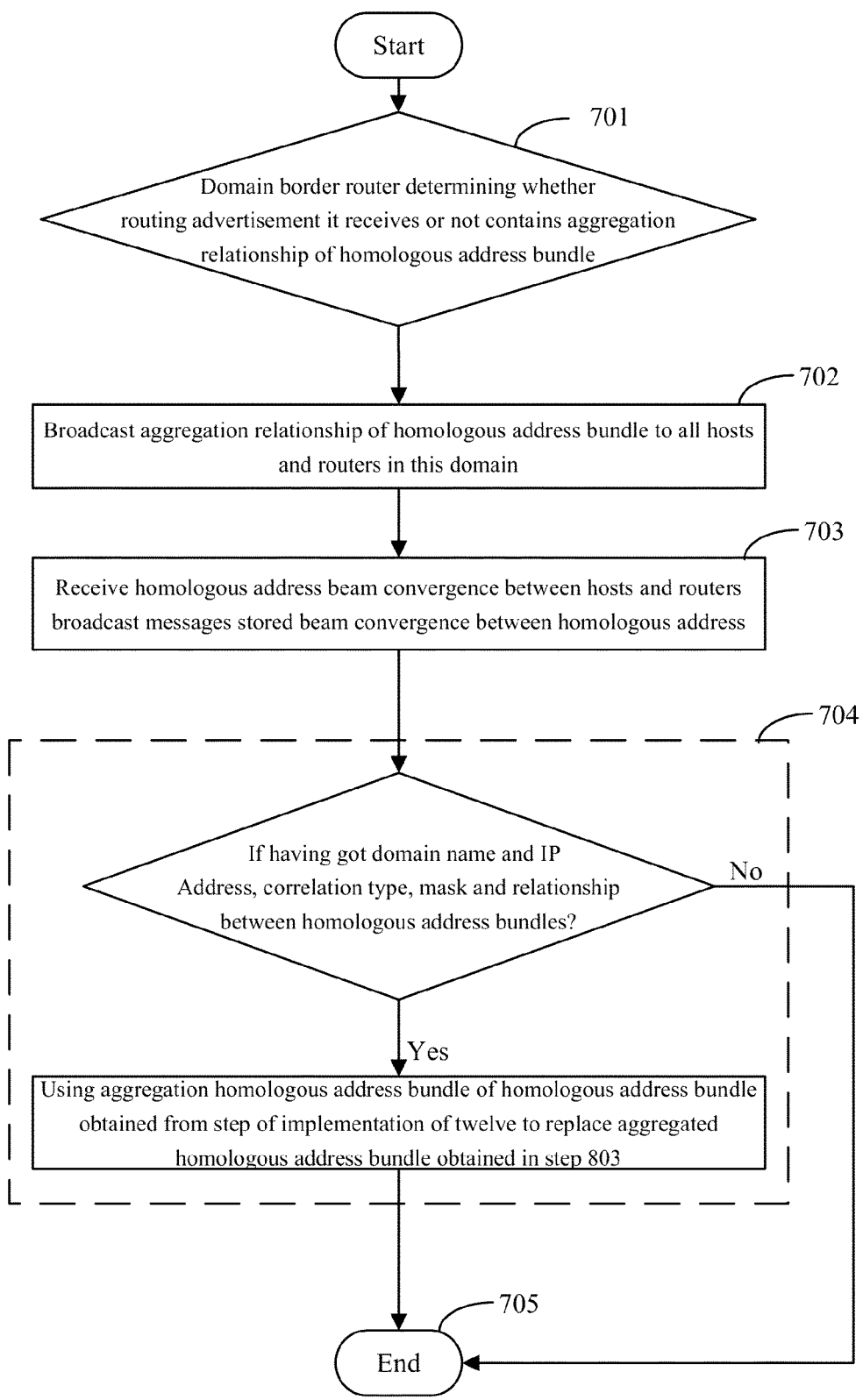
FIG. 10 shows a flow block diagram of the execution of the spreading process of the source address bunch of source aggregation network routing system.

Aggregation spread means that a domain border router which receives advertisement of the aggregation of the source address bunch relationship (routers based on source address bunch or routers based on source aggregation) broadcast this aggregation to all hosts and routers in this domain Referring to FIG. 10, the aggregation spread is achieved through the following steps:

Step 701: The domain border router determines whether the routing advertisement it receives or not comprises aggregation relationship of the source address bunch, if yes, then go to step 702; otherwise, the end.

An aggregation relationship of the source address bunch comprises multiple aggregated source address bunch identifier and identifier of aggregation source address bunch.

Step 702: broadcast aggregation relationship of the source address bunch to all hosts and routers in this domain through broadcast protocol message.

Step 703: receive source address bunch convergence between hosts and routers broadcast messages stored beam convergence between source address.

Step 704: For one aggregated source address bunch in the aggregation relationship in this source address bunch, if you have got the domain name and the IP address, association type, mask and the relationship between the source address bunches, use the aggregation source address bunch of the source address bunch obtained from the step of the implementation of twelve to replace the aggregated source address bunch obtained in step 803.

Step 705: End.

VII. Example of Implementation of Intra-Domain Routing Method Based on Source Address Bunch Current protocols, for example, RIP, OSPF, IS-IS, etc. can be used as intra-domain of routing structure of source aggregation, but, if the network part of these protocol messages were planned to be filled with traditional prefix, now it will be filled with source address bunch. For example, for RIP and OSPF protocol, the form of expression of network address prefix in original messages is:

| 0 | 31 |
|---|---|
| IP address | |
| Mask | |

The form of current expression of the linear source address bunch is:

| 0 | | 31 |
|---|---|---|
| the front end of the root block of the source address bunch | | |
| linear association | the length of source address block | upper-limit |
| length of exceptional list | exceptional list (variable length) | | where the front end of the root block of the source address bunch, the length of source address block, upper-limit correspond to $F_0$, n and r in the above formula (1), linear association indicates the association is linear, and exceptional list lists the exponential value i that does not belong to the source address block of that linear source address bunch.

The general form of exponential source address bunch is:

| 0 | | 31 |
|---|---|---|
| the front end of the root block of the source address bunch | | |
| exponential association | exponential association | exponential association |
| exponential base | | |
| length of exceptional list | length of exceptional list | |

Thereinto, the front end of the root block of the source address bunch, the length of source address block, upper-limit and exponential base correspond to $F_0$, n, r and a in the above formula (2), and exponential association indicates the association is index, exceptional list lists the exponential value i that does not belong to the source address block of that exponential source address bunch. If a=2, exponential base field is not required, i.e:

| 0 | | 31 |
|---|---|---|
| the front end of the root block of the source address bunch | | |
| exponential association | the length of source address block | upper-limit |
| length of exceptional list | exceptional list (variable length) | |

Note that the two attributes of the front end of the root block of the source address bunch and the length of source address block are equivalent to the two attributes of the IP address traditional prefix and mask.

After these modifications, intra-domain router based on source address bunch can establish intro-domain routing through the appropriate intra-domain routing protocol, and its routing table uses the two attributes of IP address and source address block size as exponential of the source address bunch, for the specific structure of the routing table, referring to the implementation of intra-domain and inter-domain routing table structure below.

VIII. Example of an Inter-Domain Routing Method Based on Source Address Bunch

Similar to the modifying current intra-domain routing protocol based on the intra-domain routing of the source address bunch, current inter-domain routing protocol BGP cannot be used for inter-domain routing protocol of source aggregation routing structure unless being modified. If we need to fill traditional prefix in the network address part of BGP protocol message, now it shall be changed to filling source address bunch. For example, the form of network address prefix expressed in the original BGP message is:

| 0 | 7 | 8 | 39 |
|---|---|---|---|
| | Prefix length | prefix | |

To change to the expression of the source address bunch, and the form of the linear source address bunch is as follows:

| 0 | | | 31 |
|---|---|---|---|
| | the front end of the root block of the source address bunch | | |
| linear association | the length of source address block | | upper-limit |
| length of exceptional list | exceptional list (variable length) | | |

Thereinto, the front end of the root block of the source address bunch and the length of source address block correspond to the prefix and the length of the prefix in the original BGP message. The prefix length is functionally equivalent to source address block size, namely: prefix length=$32-\log_2$ (source address block size). The general form of exponential source address bunch is as follows:

| 0 | | | 31 |
|---|---|---|---|
| | the front end of the root block of the source address bunch | | |
| exponential association | the length of source address block | | upper-limit |
| | Exponential base | | |
| length of exceptional list | exceptional list (variable length) | | |

The form of the source address bunch which has the exponential of 2:

| 0 | | | 31 |
|---|---|---|---|
| | the front end of the root block of the source address bunch | | |
| exponential association | the length of source address block | | upper-limit |
| length of exceptional list | exceptional list (variable length) | | |

After the modification is complete, the inter-domain router based on source address bunch can establish inter-domain route through BGP protocol, and its routing table use the two attributes of the front end of the root block of the source address bunch and the length of source address block as exponential of the source address bunch, for the specific structure of routing tables, refer to the example given in the implementation Nine below.

This invention assumes no spread internally for the inter-domain routing, i.e., in addition to comprising default routing information, any intra-domain router in a routing table no longer be comprised in any other inter-domain information.

IX. Example of Routing Table Structure of Intra-Domain and Inter-Domain Routers

This invention represents intra-domain route with source address bunch rather than the current address prefixes, therefore, intra-domain establishes and expresses intra-domain route based on the running intra-domain routing protocol, and use the source address bunch as the exponential of intra-domain routing table. A routing table of an intra-domain router is a set of information of the source address bunch, each set element is a routing table entry, source address bunch is the keyword to retrieve the routing entry, and the general structure of an intra-domain routing table is as follows:

| Identifier of the source address bunch | Route attributes | Others |
|---|---|---|
| source address bunch-1 | . . . | . . . |
| source address bunch-2 | . . . | . . . |
| . . . | . . . | . . . |
| source address bunch-n | . . . | . . . |

Thereinto, identifier of the source address bunch is the handle of the source address bunch. Handle of the source address bunch can be calculated from the two attributes of the front end of the root block of the source address bunch and the length of source, and the specific method is: assume the total length of address is q bit, the length of source address block is M continuous addresses, and the corresponding handle of the source address bunch is high $q-\log(M)$ bits of the front end of root block of the source address bunch splicing the rest low $\log(M)$ zero bits. Both "route attributes" and "others" are normal routing table fields. For example, a domain router has $b_1, b_2, \ldots, b_n$, n routing table entries in total, then its routing table structure is as follows:

| Identifier of the source address bunch | Route attributes | Others |
|---|---|---|
| $b_1$ | . . . | . . . |
| $b_2$ | . . . | . . . |
| . . . | . . . | . . . |
| $b_n$ | . . . | . . . |

Similarly, inter-domain routers express and establish inter-domain routing with source address bunch based on the running inter-domain routing protocol, and use source address bunch as exponential of inter-domain routing table to forward packets. Since this invention does not consider intra-domain source aggregation, different from the case in domain, inter-domain routing table of inter-domain router is divided into two parts, non-aggregation and aggregation. Non-aggregation part comprises entries corresponding to all the first-order aggregation source address bunch, aggregation part comprises corresponding entries of second-order and higher-order aggregation source address bunches. Each first-order aggregation source address bunch entry comprises "identifier of the source address bunch", "route attributes" and others, and in addition to "identifier of the source address bunch", "route attributes" and "others", each second-order and high-order aggregation source address bunches comprise the attribute of "the relationship between the aggregation source address bunch and the aggregated source address bunch", and each source address bunch aggregation run locally is recorded the corresponding source address bunch aggregation by the attribute. The attribute of aggregation relationship is made of two identifiers: "aggregation symbol identifier" expresses aggregation source address bunch, but "aggregation group identifier" expresses aggregation source address bunch and all aggregated source address bunch. The general structure of inter-domain routing table is as follows:

| Identifier of source address | Identifier of aggregation symbol | Identifier of aggregation group | Route attributes | Others |
|---|---|---|---|---|
| Non-aggregation source address bunch-1 | 0 | — | ... | ... |
| Non-aggregation source address bunch-2 | 0 | — | ... | ... |
| ... | | | ... | ... |
| Non-aggregation source address bunch-n | 0 | — | ... | ... |
| aggregation source address bunch-A1 | 1 | A1 | ... | ... |
| aggregated source address bunch-A1 | 0 | A1 | ... | ... |
| ... | | | ... | ... |
| aggregated source address bunch-Am | 0 | A1 | ... | ... |
| aggregation source address bunch-B1 | 1 | B1 | ... | ... |
| aggregated source address bunch-B1 | 0 | B1 | ... | ... |
| ... | | | ... | ... |
| aggregated source address bunch-Bm | 0 | B1 | ... | ... |
| ... | | | ... | ... |
| aggregation source address bunch-Z1 | 1 | Z1 | ... | ... |
| aggregated source address bunch-Z1 | 0 | Z1 | ... | ... |
| ... | | | ... | ... |
| aggregated source address bunch-Zm | 0 | Z1 | ... | ... |

Thereinto, identifier of aggregation symbol=1 indicates that the corresponding source address bunch is the source address bunch aggregated, and what it aggregates is all source address bunch where aggregation symbol identifier=0 and "aggregation group identifier" have the same value, identifier of aggregation symbol=0 and "aggregation group identifier='-'" means a source address bunch not aggregated, i.e., non-aggregation source address bunch. For example, an inter-domain router has K source address bunch, $B_1, B_2, \ldots, B_K$, where $B_i$ aggregate $B_{i1}, B_{i2}, \ldots, B_{im}$ (i=1, 2, ..., K) source addresses of the beam convergence, which together $B_i B_{i1}, B_{i2}, \ldots, B_{im}$ (i=1, 2, ..., K) of m source address bunch. Then its routing table structure is as follows:

| Identifier of source address | Identifier of aggregation symbol | Identifier of aggregation group | Route attributes | Others |
|---|---|---|---|---|
| $b_1$ | 0 | — | ... | ... |
| $b_2$ | 0 | — | ... | ... |
| ... | | | ... | ... |
| $b_n$ | 0 | — | ... | ... |
| $B_1$ | 1 | 1 | ... | ... |
| $B_{11}$ | 0 | 1 | ... | ... |
| $B_{1m}$ | 0 | 1 | ... | ... |
| $B_2$ | 1 | 2 | ... | ... |
| $B_{21}$ | 0 | 2 | ... | ... |
| ... | | | ... | ... |
| $B_{2m}$ | 0 | 2 | ... | ... |
| ... | | | ... | ... |
| $B_K$ | 1 | K | ... | ... |
| $B_{K1}$ | 0 | K | ... | ... |
| ... | | | ... | ... |
| $B_{Km}$ | 0 | K | ... | ... |

Note that because this invention does not consider the intra-domain router based on source aggregation and inter-domain router does not spread in the domain, routing tables of intra-domain router does not comprise two fields of aggregation symbol identifier and aggregation symbol identifier.

X. Example of Forwarding Table Structure of Intra-Domain and Inter-Domain Router Forwarding table is a simple form of the routing table, which is used to achieve the fast forwarding of packets. Forwarding table entries correspond to routing table entries, and forwarding table no longer comprises the "aggregation group identifier", "route attributes" and "others" properties; however, there are two more attributes of "next-hop identifier" and "output port number". Source address bunch is keyword to query the required tables. The forwarding table of an intro-domain has the following general structure:

| Identifier of source address | Next hop identifier | Port of output interfaces |
|---|---|---|
| source address-1 | ... | ... |
| source address-2 | ... | ... |
| ... | ... | ... |
| source address-n | ... | ... |

The "next hop identifier" and "output port" are formal forwarding entry fields. For example, an intra-domain router has $b_1, b_2, \ldots, b_n$, n forwarding entry, and its forwarding table structure is as follows:

| Identifier of source address | Next hop identifier | Port of output interfaces |
|---|---|---|
| $b_1$ | ... | ... |
| $b_2$ | ... | ... |
| ... | ... | ... |
| $b_n$ | ... | ... |

Similar to the inter-domain routing tables of inter-domain router, inter-domain forwarding is also divided into two parts, non-aggregation and aggregation. For each source address bunch which runs locally, the forwarding table only comprise corresponding "aggregation symbol identifier" and no longer comprises the aggregation relationship "aggregation group identifier". The general structure of inter-domain forwarding is as follows:

| Identifier of source address | Aggregation symbol identifier | Next hop identifier | Port of output interfaces |
|---|---|---|---|
| source address-1 | | ... | ... |
| source address-2 | | ... | ... |
| ... | | ... | ... |
| source address-n | | ... | ... |

For example, an inter-domain router has K source addresses bunches, $B_1, B_2, \ldots, B_K$, where $B_{i1}, B_{i2}, \ldots, B_{im}$ (i=1, 2, . . . , K) of the m source addresses bunches. Then its forwarding table structure is as follows:

| Identifier of source address | Aggregation symbol identifier | Next hop identifier | Port of output interfaces |
|---|---|---|---|
| $b_1$ | 0 | ... | ... |
| $b_2$ | 0 | ... | ... |
| ... | | ... | ... |
| $b_n$ | 0 | ... | ... |
| $B_1$ | 1 | ... | ... |
| $B_{11}$ | 0 | ... | ... |
| ... | | ... | ... |
| $B_{1m}$ | 0 | ... | ... |
| $B_2$ | 1 | ... | ... |
| $B_{21}$ | 0 | ... | ... |
| ... | | ... | ... |
| $B_{2m}$ | 0 | ... | ... |
| ... | | ... | ... |
| $B_K$ | 1 | ... | ... |
| $B_{K1}$ | 0 | ... | ... |
| ... | | ... | ... |
| $B_{Km}$ | 0 | ... | ... |

Note that because this invention does not consider the intra-domain router based on source aggregation and inter-domain router does not spread in the domain, routing tables of intra-domain router does not comprise two fields of aggregation symbol identifier and aggregation symbol identifier.

XI. Example of the Storage Method and Type of the Source Address Bunch in Datagram We have an example of IPv6 protocol to explain the store method and store form of source address in the datagrams. The object the datagrams comprise source address bunch is to express source IP address, destination IP address and the corresponding source address bunch affiliation relationship; therefore, how source address bunch is stored in datagrams is to store the handle of source address bunch where source IP address and destination IP address locate and the distance from the handle of source address block to the handle of the source address bunch in the packets option needed to be processed by-hop. For IPv6 packet, the form of source address and destination address storage is as follows:

(1) the source and destination IP addresses are still stored in the fields of packet headers of "source IPv6 address" and "destination IPv6 address";

(2) the distance from the handle of source address block to the handle of the source address bunch is stored in the "hop extension header" in the following format:

> IPv6 packet header (40 bytes)
> Next packet header (1 byte)
> Length of extension header (1 byte)
> Type of extension header (1 byte)
> Length of extension header data (1 byte)
> Association type of destination address (1 bit)
> Mask of destination address (7 bits)
> Offset of destination address (16 bytes)
> Association type of source address (1 bit)
> Source address mask (7 bit)
> Offset of source address (16 bytes)
> Next packet header (1 byte)
> . . .

There are 8 fields of source address bunch in "hop extension header" in a total of 36 bytes, counting together required "next packet header" and "Extended header length" in "hop by hop extension header" the total bytes are 38 bytes. The value of "next packet header" is the identifier located in the next extension header after "by-hop extension header" and the value of "Extended header length" is the number of bytes in the whole "by-hop extension header" field (excluding the number of bytes in the first field of "next packet header").

In the "by-hop extension header" which comprises source address bunch information, the field of "extension header type" occupies one byte, the highest two bits are encoded as "01", indicating the device which does not support the source address should discard corresponding packets, and the remaining 6 bits are encoded as "100000", indicating that the following 35 bytes are data content of source address. "Extended header data length" field occupies 1 byte, indicating the number of bytes from the first byte of the rear to the field of "Source Address Offset". The two fields, "destination address association type" and "destination address mask" together occupy one byte, where "destination address association type" occupies the highest bit, "destination address mask" occupies the remaining six bits, 0 and 1 of "destination address association type" represent, linear association and exponential association respectively, the effective range of "destination address mask" is 1 to 127. "Destination address offset" field occupies 16 bytes, which means that the difference between the handle of source address block where the destination address locates and the handle of the source address bunch which comprises the source address block. where the source address that comprises the address of beam block source to the handle of. The "Association type", "Mask" and "Offset" of source address are similar to the destination address, not repeated here.

In addition to source address bunch information, "by-hop extension header" may also comprise other types of information. When a variety of information is also in by-hop extension header, there needs a special coding for the lower six bits of the field of "extension header type" to represent the order (or relative order) of such a variety of information in this by-hop extension header, and this content is beyond the scope of the invention, not repeated here.

XII. Example of the Generation Process of Host Packet

In this invention, source or destination IP address in each host packet's comprises four elements of IP address, association type, mask and offset, and the generation process of host packet is to get these four elements and fill them in the IP packet, the following describe the two processes of obtaining source address elements and fill out elements respectively.

The process of obtaining source address elements is divided into two sub-processes, querying domain name server and assigning offsets, and the two sub-processes shall be completed in sequence.

Figure 11:
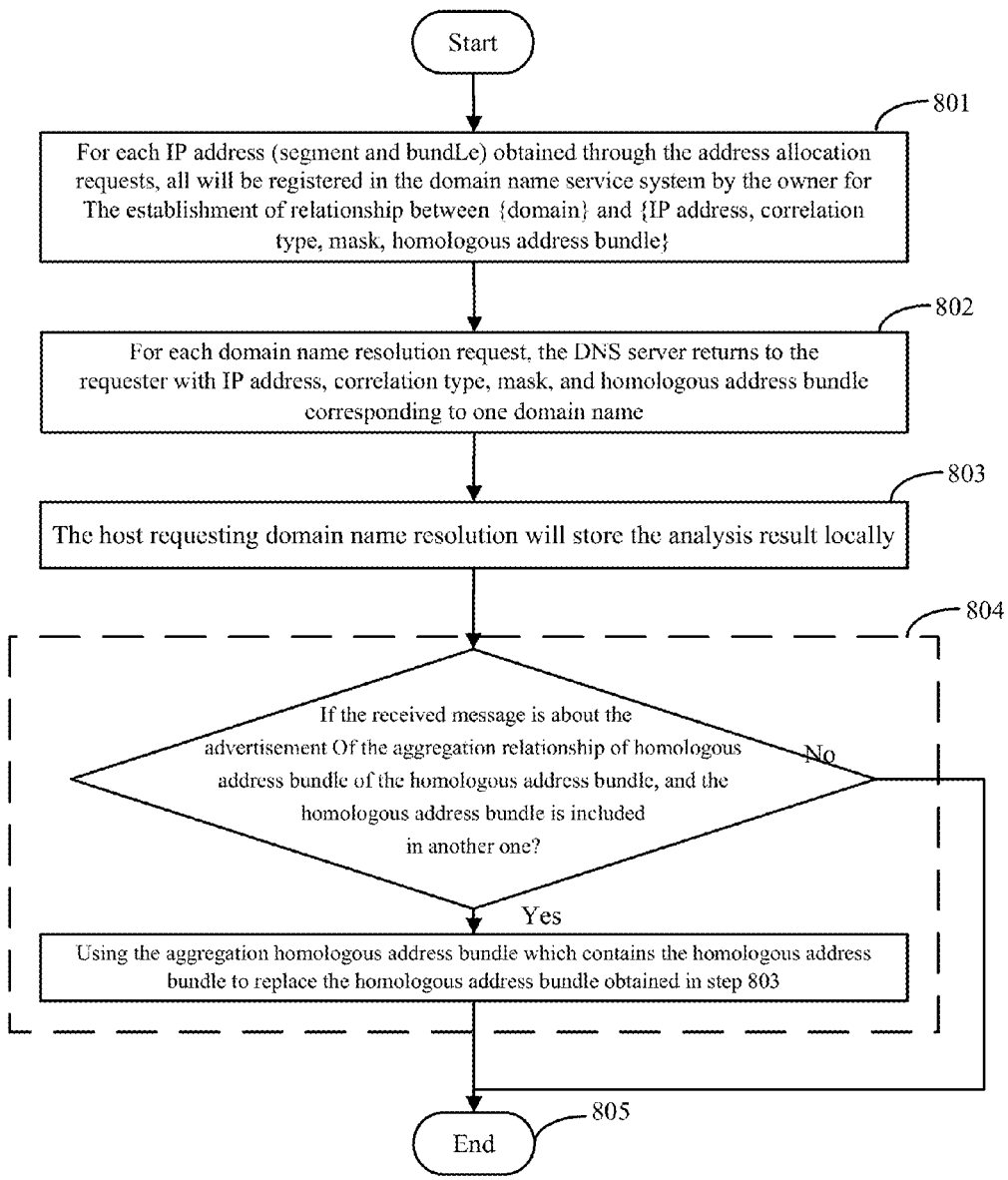
FIG. 11 shows a flow block diagram of the sub-process of host query domain name server of source aggregation network routing system.

Host gets the domain name and IP address, association type, mask, and correspondence relationship between source address bunches by querying the name server sub-process. Referring to FIG. 11, the sub-process of querying name server can be performed with the following steps:

Step 801: For each IP address (block and bunch) obtained through the address allocation requests, all will be registered in the domain name service system by the owner for the establishment of relationship between {domain} and {IP address, association type, mask, source address bunch}. Thereinto, "IP address" and "mask" represent source address block where the IP address locates, "source address bunch" is the identifier of the source address bunch of source address block which comprises the IP address.

Step 802: For each domain name resolution request, the DNS server returns to the requester with IP address, association type, mask, and source address bunch corresponding to one domain name.

Step 803: The host requesting domain name resolution will store the analysis result (i.e., domain name, IP address, association type, mask, and source address bunch) locally.

Step 804: If the received message is about the advertisement of the aggregation relationship (see Example VI "aggregation spread") of the source address bunch of the source address bunch (obtained from step 803), and the source address bunch is comprised in another one, then use the aggregation source address bunch which comprises the source address bunch to replace the source address bunch obtained in step 803.

Step 805: End.

Figure 12:
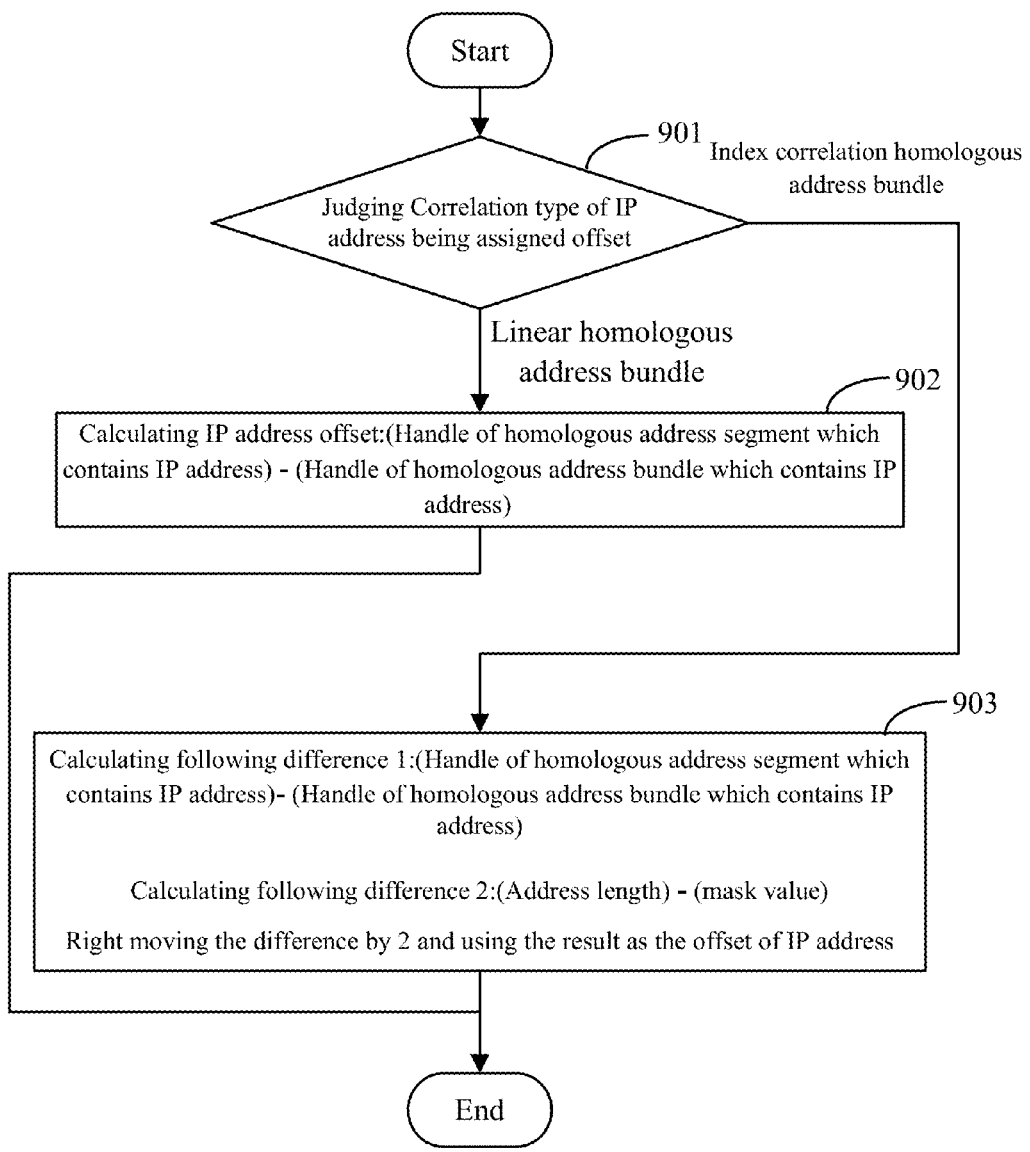
FIG. 12 shows a flow block diagram of the execution of the sub-process of the calculation of offset by source aggregation network routing system hosts.

The sub-process of host assigning offset shall follow the sub-process of querying name servers immediately, and the aim is to capture a top aggregation source address bunch of a destination IP address, and then get offset from the top aggregation source address bunch to the source address block which directly comprises the destination IP address. Referring to FIG. 12, the sub-process of assigning offset is through the following steps:

Step 901: If the association type of the IP address being assigned the offset is linear, go to step 902; if it is index, go to step 903, Step 902: calculate the following difference and use the difference as the IP address offset:

(The handle of source address block which comprises the IP address)−(The handle of the source address bunch which comprises the IP address), End.

Step 903: Calculate the following difference 1: (The handle of source address block which comprises the IP address)−(The handle of the source address bunch which comprises the IP address)

Calculate the following difference 2: (Address length)−(mask value), right move the difference by 2 and use the result as the offset of the IP address, end.

The process of filling elements of source address follows the process of obtaining elements, and it is the process of putting IP address, association type, mask and offset into the IP packet, which is executed through the following steps.

Step 1001: For an IP address, get its source address association type, mask and source address bunch from the local memory, and put them into the fields of IP packet's IP address, association type, mask and offset respectively, end.

Note that the above two sub-processes of querying name servers and assigning offsets are mainly used for a host acquiring source address elements of others. The source address element of a host itself can be obtained by other more simple method, for example, internal allocation and manual configuration, which is beyond the scope of the invention.

XIII. Example of the Method and the Process of Datagram Forwarding by Intra-Domain and Inter-Domain Routers Packet forwarding function is divided into three sub-functions, packet forwarding in source routing domain, packet forwarding between routing domains and packet forwarding in destination routing domain. For packet forwarding that the source and destination hosts in a routing domain, it only involves a sub-function, the "packet forwarding in source routing domain,", and packet forwarding that the source and destination hosts not in a routing domain, it involves the above three sub-functions. The following describe the three different forwarding methods and processes respectively.

Figure 13:
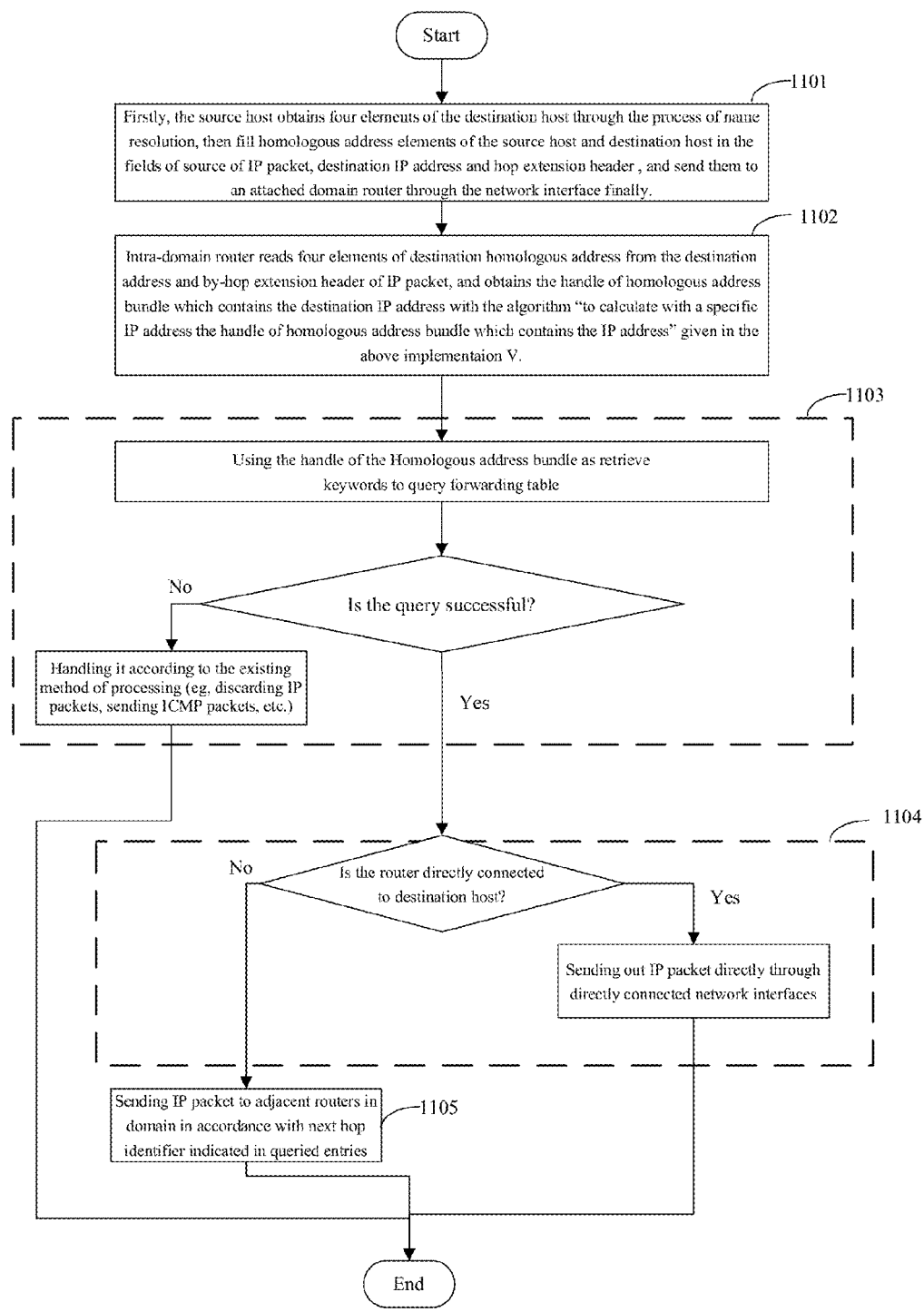
FIG. 13 shows a flow diagram of the execution of the datagram forwarding in the source routing domain of source aggregation network routing.

Packet forwarding that the source and destination hosts in a routing domain is achieved through the process of packet forwarding in the source routing domain Referring to FIG. 13, packet forwarding in the source routing domain is performed through the following steps:

Step 1101: firstly, the source host obtains four elements of the destination host through the process of name resolution, then fill source address elements of the source host and destination host in the fields of source of IP packet, destination IP address and hop extension header, and send them to an attached domain router through the network interface finally.

Step 1102: intra-domain router reads four elements of destination source address from the destination address and by-hop extension header of IP packet, and obtains the handle of the source address bunch which comprises the destination IP address with the algorithm "to calculate with a specific IP address the handle of the source address bunch which comprises the IP address" given in the above implementation V.

Step 1103: use the handle of the source address bunch as retrieve keywords to query forwarding table, if the query fails, handle it according to the existing method of processing (e.g., discarding IP packets, sending ICMP packets, etc.); If the query is successful, go to step 1104.

Step 1104: make further judgment for queried forwarding entries as follows:

(1) If the router is directly connected to the destination host, then send out IP packet directly through directly connected network interfaces; otherwise perform (2).

(2) send IP packet to adjacent routers in the domain in accordance with the next hop identifier indicated in the queried entries, the end.

Step 1105: The router directly connected to the destination host sends IP packets to the network block where the destination host locates.

Step 1106: The destination host receives and accepts IP packets. The end.

Figure 14:
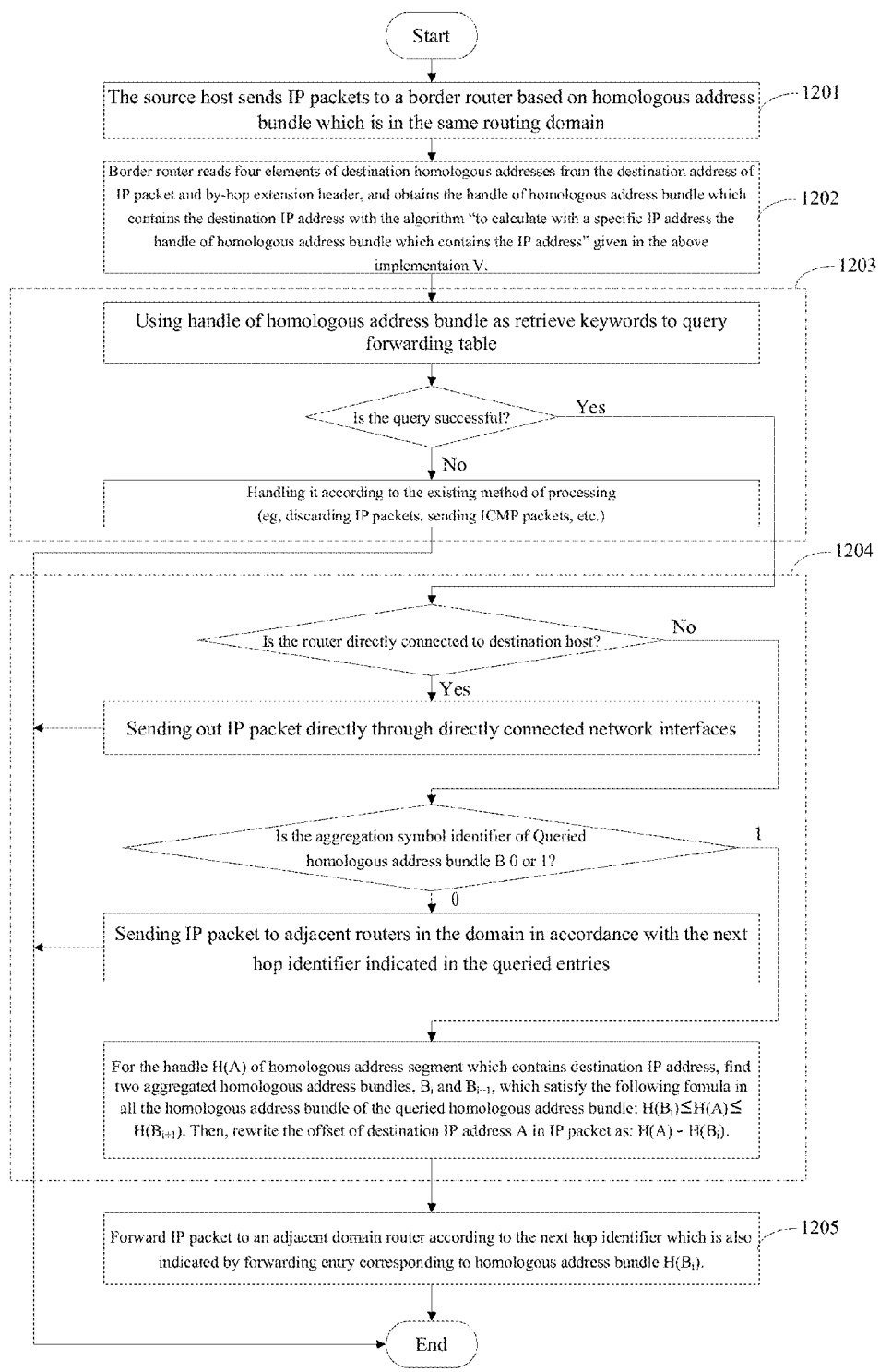
FIG. 14 shows a flow diagram of the execution of the datagram forwarding between the source routing domains of source aggregation network routing system.

Packet forwarding that source and destination hosts not in the same routing domain is achieved simultaneously by the source routing domain forwarding, inter-domain forwarding and destination routing domain forwarding. Refer to FIG. 14, the inter-domain routing packet forwarding is performed through the following steps:

Step 1201: The source host sends IP packets to a border router based on source address bunch which is in the same routing domain (the border router is an inter-domain router).

Step 1202: Border router reads four elements of destination source addresses from the destination address of IP packet and by-hop extension header, and obtains the handle of the source address bunch which comprises the destination IP address with the algorithm "to calculate with a specific IP address the handle of the source address bunch which comprises the IP address" given in the above implementation V.

Step 1203: use the handle of the source address bunch as retrieve keywords to query forwarding table, if the query fails, handle it according to the existing method of processing (e.g., discarding IP packets, sending ICMP packets, etc.); if the query is successful, go to step 1204.

Step 1204: make further judgment for queried forwarding entries as follows:

(1) If the router is directly connected to the destination host, then send out IP packet directly through directly connected network interfaces; otherwise perform (2).

(2) If the aggregation symbol identifier of queried source address bunch B is 0, send IP packet to adjacent routers in the domain in accordance with the next hop identifier indicated in the queried entries, end; otherwise go to (3).

(3) If the aggregation symbol identifier of queried source address bunch B is 1, then for the handle H(A) of source address block which comprises destination IP address, find two aggregated source address bunches, $B_i$ and $B_{i+1}$, which satisfy the following formula in all the source address bunch of the queried source address bunch:

$$H(B_i) \leq H(A) \leq H(B_{i+1})$$

Then, rewrite the offset of destination IP address A in IP packet as:

$$H(A)-H(B_i)$$

Go to step 1205.

Note that, source address bunch that $H(B_i)$ corresponds may be aggregation source address bunch rather than one aggregated source address bunch.

Step 1205: Forward IP packet to an adjacent domain router according to the next hop identifier obtained in step 1205 (3), which is also indicated by forwarding entry corresponding to source address bunch $H(B_i)$. End.

Figure 15:
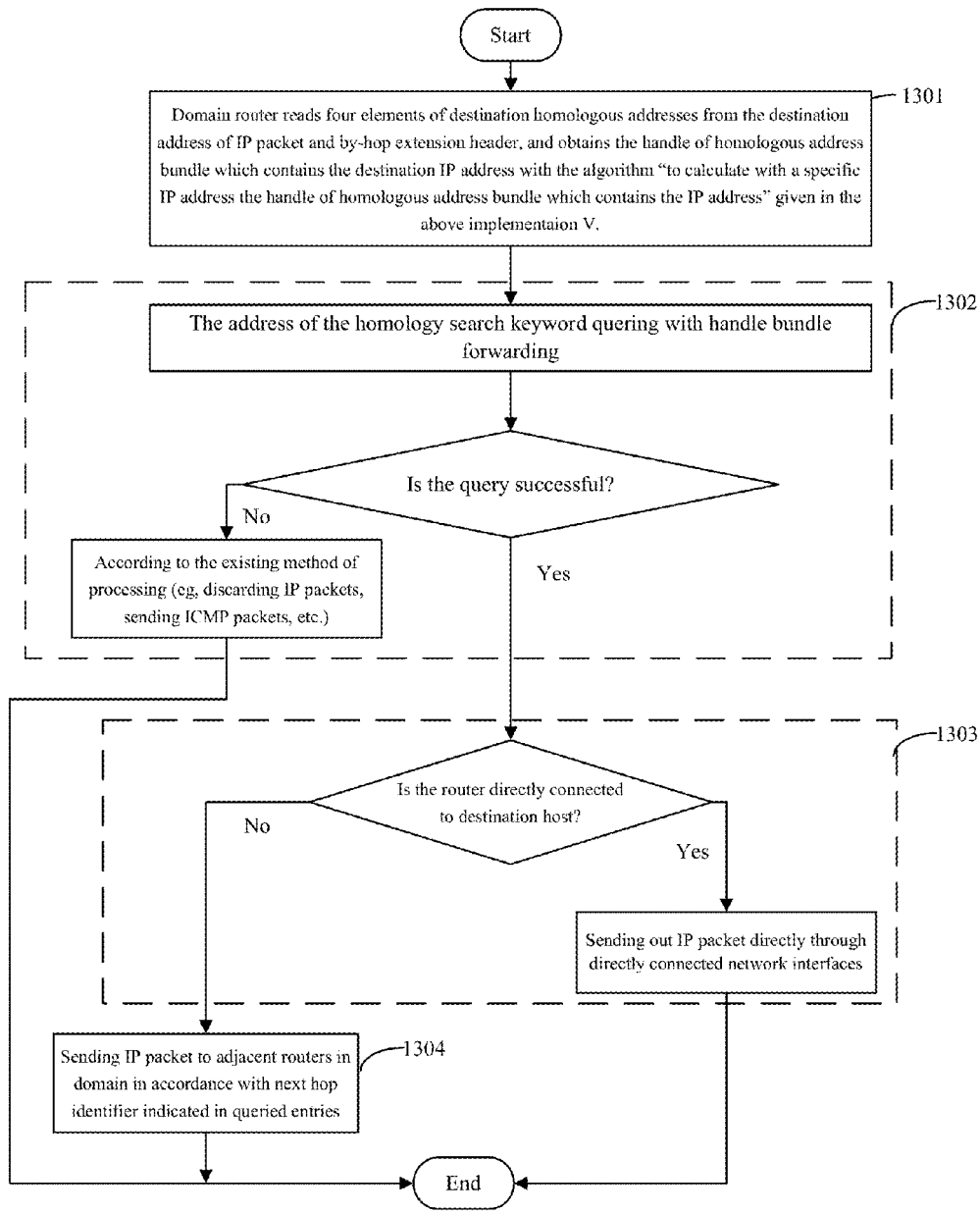
FIG. 15 shows a flow block diagram of the execution of the datagram forwarding in the source routing domains of a source aggregation network routing system.
Figure 16:
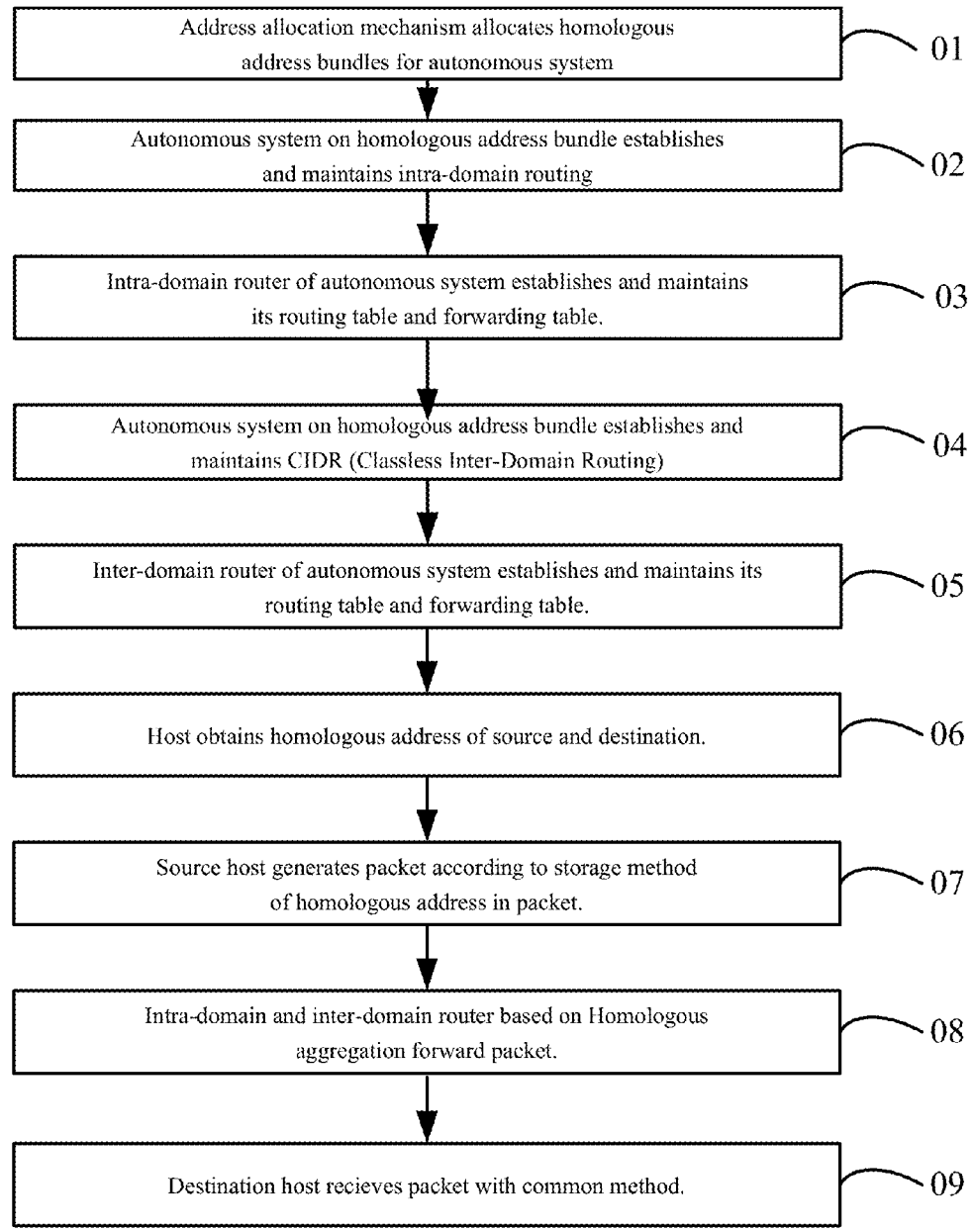
FIG. 16 shows a flow block diagram of the execution of a source aggregation network routing system.

Referring to FIG. 15, packet forwarding of the destination routing domain is achieved through the following steps:

Step 1301: Domain router reads four elements of destination source addresses from the destination address of IP packet and by-hop extension header, and obtains the handle of the source address bunch which comprises the destination IP address with the algorithm "to calculate with a specific IP address the handle of the source address bunch which comprises the IP address" given in the above implementation V.

Step 1302: The address of the source search keyword query with handle bunch forwarding, if the query fails, according to the existing method of processing (e.g., discarding IP packets, sending ICMP packets, etc.); If the query is successful, perform steps 1303.

Step 1303: make further judgment for queried forwarding entries as follows:

(1) If the router is directly connected to the destination host, then send out IP packet directly through directly connected network interfaces; otherwise perform (2).

(2) Send IP packet to adjacent routers in the domain in accordance with the next hop identifier indicated in the queried entries, the end.

Step 1304: The router directly connected to the destination host sends IP packets to the network block where the destination host locates.

Step 1305: The destination host receives and accepts IP packets. The end.

As you can see in the implementation of this invention, this invention provides a new base aggregation mechanism for continuous non-numeric addresses: source address aggregation, and describe corresponding routing methods, routing tables and forwarding table structure on the base of that mechanism, the above-mentioned mechanisms, methods and structures form a new source address aggregation system. In the example of this invention, the network address allocation mechanism can allocate one or more source address bunches without the constraint of "keeping successive addresses"; autonomous system which gets the assigned source addresses bunch may advertise its own source address bunch directly to outside domains, and it can also advertise after aggregating multiple source address bunch. If the bunches are aggregated, we need to store the aggregation relationship in the routing tables and forwarding tables in the router, for an inter-domain router which receives advertisement of the source address bunch from other inter-domain routers, and it can also perform the action of aggregating source address bunch; inter-domain and intra-domain routers can use source to replace current prefix to establish intra-domain and inter-domain routing respectively, and it can also use the source address bunch to replace the exponential of the prefix routing table and forwarding table; the two processes of domain resolution and aggregation spread can make hosts get source address elements of each destination IP address, and hosts use source elements to generate source and destination address of an IP datagram; for each IP datagram received, each intra-domain or inter-domain router reads the source address element of destination address and use the algorithm of the source address bunch address aggregation to calculate the source address bunch corresponding to the destination address, then use the source address bunch to retrieve forwarding tables, and forward the packets to next hop router finally.

In this specification, each example is described in inter-related and progressive way, the same or similar parts of each one can be referenced each other, the focus of each one is different from the other. In particular, for routing units based on source address bunch and routing units based on source aggregation, it is substantially similar to the implementation method, so the description is simple, for relevant information, refer to the instruction of the implementation of other relevant case.

Although this invention gives an introduction in detail to novel global address aggregation methods, intra-domain and inter-domain routing method, routing table structure of intra-domain and inter-domain routers, and intra-domain and inter-domain packet forwarding methods and network equipments provided in this invention, in this paper we describe the rule and example of this invention through specific applications. The above description of the example of this invention is used to help understand the method and structure; meanwhile, for persons of ordinary skill in the field, the particular example and application of this invention, may change according to ideas, methods and structures in this invention. In summary, this specification shall not be regarded as restraint of this invention.

From the above content of the invention and example, technicians in this field can clearly understand this invention, and can realize this invention by means of software and necessary universal hardware platform. Based on the understanding of the technique of this invention, the technical solutions in this invention or the contribution to current technology is essentially embodied in the form of digital products, the computer software products and/or digital products can be stored in a storage medium, such as ROM/RAM, Flash, disk, optical disk, comprising several instructions to make a computer device (may be a personal computer, a server, or network equipment) perform the various example of this invention or the methods described in some par.

The invention claimed is:

1. A method of creating a scalable source IP address bunch in a router, the method comprising:
   constituting a source IP address block in the router;
   associating the source IP address block using an association function to form a source IP address bunch in the router; and allocating, splitting, merging, and aggregating the source IP address bunch in the router to reduce a storage size of a routing table stored in the router, and releasing storage space in the router for storing IP information of additional network devices;

wherein the source IP address block is a sequence of continuous or discontinuous internet IP addresses having a size of n or $2^k$ (k=log n), n IP address sequences being $a_1, a_2, a_n$, where $a_{i+1}=a_i+1$, i=1, 2, n−1, $a_1$ to $a_n$ are divisible by 2;

the source IP address bunch means a set of r continuous or discontinuous source IP address blocks in the router, a first source IP address block $S_0$ is called a root block of the source IP address bunch, and a handle of the root block is a handle of the source IP address bunch;

associating the source IP address block through the association function to form the source IP address bunch in the router comprises linking the r continuous or discontinuous source IP address blocks to each other and forming the source IP address bunch using the association function in the router;

the association function comprises a linear association and an exponential association;

the linear association refers to linking the r continuous or discontinuous source IP address blocks of a size n through a linear relationship;

the exponential association refers to linking the r continuous or discontinuous source IP address blocks of the size n through an exponential relationship;

a rule of allocating the source IP address bunch comprises: 1) any root block of two source IP address bunches are not the same; 2) overlap is allowed between domains of a linear association of the source IP address bunch and an exponential association of the source IP address bunch; 3) no overlap between domains of two linear associations of the source IP address bunch is allowed; 4) overlaps between domains of two exponential associations of the source IP address bunch are allowed; 5) domains of different sizes should be interleaved; and 6) domains of the same size can overlap;

allocating the source IP address bunch is in accordance with a best matching rule, which refers to minimizing the difference between an actually allocated amount and a requested amount;

splitting the source IP address bunch refers to splitting a large source IP address bunch into a number of small source IP address bunches;

merging the source IP address bunch refers to merging a number of the small source IP address bunches into the large source IP address bunch; and an algorithm of aggregating the source IP address bunch comprises a first algorithm using an association A, an exponential base b, a filter symbol M, and an offset O to express a relationship between a specific IP address D and a source IP address bunch containing the specific IP address D, and a second algorithm using the specific IP address D, the association A, the exponential base b, the filter symbol M, and the offset O to calculate the handle of the source IP address bunch comprising the specific IP address D and to get a handle $H_s$ of the source IP address block comprising the specific IP address D.

2. A router comprising a network routing system for conducting the method of claim 1, the network routing system comprising: a routing structure comprising aggregated source IP address bunches, spreading device of aggregation of the source IP address bunches, intra-domain routing based on the source IP address bunches, inter-domain routing based on the source IP address bunches, a routing table structure based on the intra-domain or the inter-domain routing of the source IP address bunches, a forwarding table of an intra-domain router or an inter-domain router, a storage form of the source IP address bunches stored in a datagram, a creation process of a datagram of source IP address bunch hosts, and a process of forwarding datagram by the intra-domain router or the inter-domain router of the source IP address bunches, wherein the routing structure comprises two types of aggregated routing units: a routing unit based on the source IP address bunch and a routing unit based on source aggregation;

the spreading device of the aggregation of the source IP address bunch broadcasts a notice of aggregation of a source IP address bunch from another routing domain to all hosts and routers in the routing domain if a domain border router receives the notice of aggregation of the source IP address bunch from another routing domain;

the intra-domain routing based on the source IP address bunch comprises use of domain routing RIP of existing IP network, OSPF, IS-IS protocols to establish an intra-domain routing domain, an IP address prefix of an original part of the network in RIP, OSPF, IS-IS protocol is changed to the source IP address bunch; the network IP address part of the original IP address uses a message to represent the linear and exponential source IP address bunches;

the inter-domain routing based on the source IP address bunch comprises:

using the inter-domain routing BGP of a current network to establish inter-domain routes, changing the IP address prefix of an IP address part in an original BGP protocol to source IP address bunch;

the routing table structure comprises an identifier of the source IP address bunch and route attributes; the identifier of the source IP address bunch is the handle of the source IP address bunch, and the route attributes are regular routing table entry fields;

the inter-domain router uses the source IP address bunch to express and establish an inter-domain route based on a running inter-domain protocol, using source IP address bunch as an exponential of an inter-domain routing table to forward a packet, the inter-domain routing table is divided into two parts of non-aggregation and aggregation;

the forwarding table of the intra-domain router or the inter-domain router is a concise form of routing tables, which is used to achieve fast packet forwarding, entries in the forwarding table correspond to entries of the routing tables one by one, the forwarding table sets an identifier of the source IP address bunch, an identifier of next hop, and an output port number;

the storage form of the source IP address bunch in the datagram comprises:

a source IP address bunch comprising four elements, the four elements are source IP address, source association type, mask, and offset; three fields in association type, mask, and offset are defined for a source and a destination of the source IP address; to express affiliations of the source and the destination IP address to the source IP address bunch where they are, four elements of source IP address of an IP address packet are stored in an IP datagram header address field and source IP address bunch association types, masks and offsets of the source of IP datagram by-hop extension header; and
the intra-domain router and inter-domain router forward packets to the host, packet forwarding comprises three sub-functions, which are packets forwarding in a source routing domain, packets forwarding between routing domains, and packets forwarding in a destination routing domain; for packets forwarding of the source and destination hosts in the same routing domain, only one sub-function related to packets forwarding in the source routing domain is provided, and for packets forwarding of the source and the destination hosts not in the same routing domain, three sub-functions described above related are provided, for packets forwarding of the source and the destination hosts in the same routing domain, the source host obtains the four elements of the destination host, then it fills the source IP address bunch of the source and the destination hosts to the IP address fields of the source and the destination IP addresses and by-hop extension header of IP datagram, and at last it sends the datagrams to its connected intra-domain router through the network interfaces, the intra-domain router reads the four elements of the destination source IP address from the destination IP address and by-hop extension header of the IP datagram; the handle of the source IP address bunch which comprises the destination IP address is obtained and is used to retrieve keywords and query forwarding tables.

3. The router of claim 2, wherein
in the inter-domain routing based on the source IP address bunch, the linear source IP address bunch comprises a front end of a root block of the linear source IP address bunch, a linear association, a length of source IP address block, an upper-limit, a length of exceptional list, and an exceptional list; the front end of the root block of the linear source IP address bunch, the length of source IP address block, the upper-limit respectively correspond to $F_0$, n and r in the expression $f^l_B(i)=F_0+n \cdot i$, $i=0, 1, 2, r-1$ of the linear association, the linear association indicates that association is linear, and the exceptional list lists the exponential i of the source IP address block that does not belong to the linear source IP address bunch;
the exponential source IP address bunch comprises a front end of a root block of the exponential source IP address bunch, an exponential association, a length of source IP address block, an upper-limit, an exponential base, a length of exceptional list, and an exceptional list; where the front end of the root block of the exponential source IP address bunch, the length of source IP address block, the upper-limit, exponential base respectively correspond to $F_0$, n, r, and a in the expression $f^e_B(i)=F_0+n \cdot (a^i-1)$, $i=0, 1, 2, r-1$ of the exponential association, the exponential association indicates that association is exponential, and the exceptional list lists the exponential i of the source IP address block that does not belong to the linear source IP address bunch; and
if a=2, the exponential source IP address bunch does not comprise the exponential base.

4. The router of claim 3, wherein the intra-domain forwarding router comprises the identifier of the source IP address bunch, the identifier of next hop, and the output port number; and the forwarding table of the inter-domain router comprises the identifier of the source IP address bunch, an identifier of aggregation symbol, the identifier of next hop, and the output port number.

5. The router of claim 2, wherein
the routing table structure comprises the identifier of the source IP address bunch, the route attributes, and others where the identifier of the source IP address bunch is the handle of the source IP address bunch, the route attributes and others are regular routing table entry fields;
a non-aggregation part comprises entries corresponding to all first-order aggregation source IP address bunch, each entry of a first-order aggregation source IP address bunch comprises attributes of the identifier of the source IP address bunch, attributes of the route attributes, and attributes of the others; and
an aggregation part comprises source IP address bunch entries corresponding to all second-order and higher order aggregation;
the inter-domain routing comprises: an identifier of non-aggregation source IP address bunch, an identifier of aggregation symbol, an identifier of aggregation group, route attributes, and others; and
when the identifier of aggregation symbol=1, the corresponding source IP address bunch is an aggregation source IP address bunch that has been aggregated locally; the one aggregated is all source IP address bunch where an identifier of aggregation group has the same value and the identifier of aggregation symbol=1; when the identifier of aggregation symbol=0 and the identifier of aggregation group=-, the source IP address bunch is not aggregated locally and is a non-aggregation source IP address bunch.

6. The router of claim 5, wherein the intra-domain forwarding router comprises the identifier of the source IP address bunch, the identifier of next hop, and the output port number; and the forwarding table of the inter-domain router comprises the identifier of the source IP address bunch, the identifier of aggregation symbol, the identifier of next hop, and the output port number.

7. The router of claim 2, wherein the routing unit based on the source IP address bunch represents an intra-domain router or an inter-domain router based on the source IP address bunch and its routing and forwarding action are all based on the source IP address bunch; as a result of the intra-domain routing or the inter-domain routing, its routing table uses source IP address bunch as an exponential to query; the routing unit uses an algorithm of the source IP address bunch to forward the datagram; an inter-domain router based on the source IP address bunch advertises to the other inter-domain router with its source IP address bunch and receives the advertisement of the source IP address bunch from the other inter-domain router; an inter-domain routing is established through the IP address of the source IP address bunch of its own and other inter-domain routers; and the routing table also uses the source IP address bunch as the exponential to query and the router based on the source IP address bunch uses source IP address bunch algorithm to forward datagrams.

8. The router of claim 2, wherein
the routing unit based on source IP address bunch represents an inter-domain router based on source IP address bunch with ability of aggregation, and its routing and forwarding actions are all based on the source IP address bunch; an aggregation on non-aggregated source IP address bunch is called first-order aggregation, and a corresponding source IP address bunch aggregation routing unit is called first-order aggregation routing unit; otherwise, they are called a high-level aggregation and a high-level aggregation routing unit respectively;

a routing domain usually transforms multiple source IP address bunches of its own into less source IP address bunches through the first-order aggregation;

the high-level aggregation is implemented by source IP address bunch aggregation routers of providers routing domain between the routing domains with provider-client relationship to aggregate the low level source IP address bunch of customers' routing domain;

the router of source aggregation uses the algorithm of the source IP address bunch, a routing domain has at least one routing unit of a source IP address bunch; as for source IP address bunch aggregation, a source IP address bunch aggregation will get multiple smaller source IP address bunch from intra-domain and outside domain, and aggregates them into a larger one and stores the aggregation association; the aggregation of the source IP address bunch is a kind of forwarding function, which refers to degrading a large source IP address bunch which the packets received from outside the domain into multiple source IP address bunches; the same as the router based on source IP address bunch, a router of source aggregation establishes the intra-domain routing through itself and the other intra-domain routers of the source IP address bunch; as a result of routing, its routing table uses the source IP address bunch as an exponential to query; the routing table of the source IP address bunch aggregation router also stores the aggregation relationship between the source IP address bunch and itself;

an inter domain aggregation router based on source IP address bunch advertises its own source IP address bunch to the other inter-domain routers;

an inter-domain router based on source IP address bunch which implements a source IP address bunch aggregation sets the aggregation symbol identifier of the routing table entries of this aggregation source IP address bunch to 1, sets the aggregation symbol identifier of the routing table entries of this aggregated source IP address bunch to 0, sets the aggregation group identifier of the routing table entries of this aggregation source IP address bunch and the routing table entries of this aggregated source IP address bunch to the identifier of this aggregation group, sets the aggregation group identifier of forwarding table entries of the aggregation source IP address bunch to 1, sets aggregated group identifier of forwarding table entries of the aggregation source IP address bunch to 0, and advertises the whole aggregation comprising the multiple source IP address bunch aggregated and a source IP address bunch; the inter-domain routers based on the source IP address bunch receive advertisement of the source IP address bunch of other inter-domain routers; as a result of establishment of the inter-domain, its routing table uses the source IP address bunch as exponential of query; the router of the source IP address bunch aggregation uses the same IP address bunch aggregation algorithm.

9. The router of claim 2, wherein in the intra-domain routing based on the source IP address bunch, the linear source IP address bunch comprises a front end of a root block of the linear source IP address bunch, a linear association, a length of source IP address block, an upper-limit, a length of exceptional list, and an exceptional list; the front end of the root block of the linear source IP address bunch, the length of source IP address block, the upper-limit respectively correspond to $F_0$, n and r in the expression $f^l_B(i)=F_0+n\cdot i$, $i=0, 1, 2, r-1$ of the linear association, the linear association indicates that association is linear, and the exceptional list lists the exponential i of the source IP address block that does not belong to the linear source IP address bunch;

the general form of exponential source IP address bunch comprises a front end of a root block of the exponential source IP address bunch, an exponential association, a length of source IP address block, an upper-limit, an exponential base, a length of exceptional list, and an exceptional list; the front end of the root block of the exponential source IP address bunch, the length of source IP address block, the upper-limit, the exponential base respectively correspond to $F_0$, n, r, and a in the expression $f^e_B(i)=F_0+n\cdot(a^i-1)$, $i=0, 1, 2, r-1$ of the exponential association, the exponential association indicates that association is exponential, and the exceptional list lists the exponential i of the source IP address block that does not belong to the linear source IP address bunch; and if a=2, the exponential source IP address bunch does not comprise the exponential base.

10. The router of claim 2, wherein the router is directly connected to the destination hosts, an IP packet is sent through the network interface directly connected; if an aggregation symbol identifier of the queried source IP address bunch B is 0, the router sends IP datagrams to an adjacent inter-domain router according to an identifier of a corresponding next hop; if the aggregation symbol identifier of the queried source IP address bunch B is 1, then for the handle of the source IP address bunch H(A) which comprises the destination IP address A, the router finds two adjacent aggregated source IP address bunches $B_i$ and $B_{i+1}$; $H(B_i) \leq H(A) \leq H(B_{i+1})$; in the aggregated source IP address bunches from the queried source IP address bunches, the router changes the offset of IP address A in an IP datagram destination IP address to $H(A)-H(B_i)$; for packets forwarding in the destination routing domain, the intra-domain router reads the four elements of source IP address from the destination IP address and by-hop extension header of IP datagrams, and calculates the handle of the source IP address bunch which comprises the destination IP address, and then uses the handle of the source IP address bunch as retrieve keywords to query the forwarding tables; if the router is directly connected to the destination host, it sends the IP datagram from the directly connected network block interface, and forwards the IP datagram to the adjacent intra-domain router according to the next hop specified in the queried entries; the intra-domain router of the directly connected host sends the IP datagram to the network block where the destination hosts locate and the destination hosts receive and accept the IP datagrams.

11. The method of claim 1, wherein the linear association is expressed as $f^l_B(i)$, $f^l_B(i)=F_0+n\cdot i$, $i=0, 1, 2, r-1$, where $F_0$ is a front end of the root block of the source IP address bunch, $f^l_B(i)$ is a front end of the root block of an i-th source IP address bunch; and the exponential association is expressed as $f^e_B(i)$, $f^e_B(i)=F_0+n\cdot(a^i-1)$, $i=0, 1, 2, r-1$, a represents a base, $F_0$ represents the front end of the root block of the source IP address bunch, $f^e_B(i)$ indicates the front end of the root block of the i-th source IP address bunch.

12. The method of claim 1, wherein minimizing the difference between the actually allocated amount and the requested amount is expressed mathematically as follows:

$$\underset{m}{\text{argmin}}\left\{\sum_{\substack{k=1\\i_k\in I}}^{m}r_{i_k}-n\right\}, I=\{1,2,\ldots,n\}$$

$$\text{s.t.}\sum_{\substack{k=1\\i_k\in I}}^{m}r_{i_k}\geq n.$$

13. The method of claim 1, wherein according to the number of the source IP address bunches after splitting the source IP address bunch, the source IP address bunch can be divided into binary split, ternary split, and the general case is w-th split, w is a positive integer greater than 1, referring to splitting the source IP address bunch into w different source IP address bunches;

the binary split of a linear source IP address bunch refers to specifying a positive integer $p_1$ such that $0<p_1<r-1$ for the linear source IP address bunch $B=\{F_0+n\cdot i, i=0, 1, 2, r-1\}$, and $$B_1=\{F_0+n\cdot i_1, i_1=0,1,p_1-1\},$$

$$B_2=\{(F_0+n\cdot p_1)+n\cdot i_2, i_2=0,1,r-1-p_1\};$$

the ternary split of the linear source IP address bunch refers to specifying two positive integers $p_1$ and $p_2$ such that $0<p_1<p_2<r-1$ for the linear source IP address bunch $B=\{F_0+n\cdot i, i=0, 1, 2, r-1\}$, and $$B_1=\{F_0+n\cdot i_1, i_1=0,1,p_1-1\},$$

$$B_2=\{(F_0+n\cdot p_1)+n\cdot i_2, i_2=0,1,p_2-1-p_1\},$$

$$B_3=\{(F_0+n\cdot p_2)+n\cdot i_3, i_3=0,1,r-1-p_2\};$$

w-th split of the linear source IP address bunch refers to specifying w−1 positive integers $p_1, p_2, p_{w-1}$ such that $0<p_1<p_2<p_{w-1}<r-1$ for the linear source IP address bunch $B=\{F_0+n\cdot i, i=0, 1, 2, r-1\}$, and $$B_1=\{F_0+n\cdot i_1, i_1=0,1,p_1-1\},$$

$$B_2=\{(F_0+n\cdot p_1)+n\cdot i_2, i_2=0,1,p_2-1-p\},$$

$$B_k=\{(F_0+n\cdot p_{k-1})+n\cdot i_k, i_k=0,1,p_k-1-p_{k-1}\}, 2\leq k\leq w-1,$$

$$B_w=\{(F_0+n\cdot p_{w-1})+n\cdot i_w, i_w=0,1,r-1-p_{w-1}\};$$

the binary split of an exponential source IP address bunch refers to specifying a positive integers $q_1$ such that $0<q_1<r-1$ for the exponential source IP address bunch $B=\{F_0+n\cdot(2^i-1), i=0, 1, 2, r-1\}$, and $$B_1=\{F_0+n\cdot(2^{i_1}-1), i_1=0,1,q_1-1\},$$

$$B_2=\{F_0\cdot(2^{q_1+i_2}-1), i_2=0,1,s-1-q_1\};$$

the ternary split of the exponential source IP address bunch refers to specifying two positive integers $q_1$ and $q_2$ such that $0<q_1<q_2<s-1$ for the exponential source IP address bunch $B=\{F_0+n\cdot(2^i-1), i=0, 1, 2, s-1\}$, and $$B_1=\{F_0+n\cdot(2^{i_1}-1), i_1=0,1,q_1-1\},$$

$$B_2=\{F_0+n\cdot(2^{q_1+i_2}-1), i_2=0,1,q_2-1-q_1\},$$

$$B_3=\{F_0\cdot(2^{q_2+i_3}-1), i_3=0,1,s-1-q_2\};$$

the w-th split of the exponential source IP address bunch refers to specifying w−1 positive integers $p_1, p_2, p_{w-1}$ such that $0<p_1<p_2<p_{w-1}<r-1$ for the exponential source IP address bunch $B=\{F_0+n\cdot(2^i-1), i=0, 1, 2, s-1\}$, and $$B_1=\{F_0+n\cdot(2^{i_1}-1), i_1=0,1,q_1-1\},$$

$$B_2=\{F_0+n\cdot(2^{q_1+i_2}-1), i_2=0,1,q_2-1-q_1\},$$

$$B_k=\{F_0+n\cdot(2^{q_{k-1}+i_k}-1), i_k=0,1,q_k-1-q_{k-1}\}, 2\leq k\leq w-1,$$

$$B_k=\{F_0+n\cdot(2^{q_{w-1}+i_w}-1), i_w=0,1,s-1-q_{w-1}\};$$

through multiple split by using a binary split iterative method, a large source IP address bunch is divided into smaller source IP address bunches with different size to meet requirements of various levels of subordinate IP address allocation mechanism; merging multiple source IP address bunches is an inverse process of splitting the source IP address bunch;

merging linear source IP address bunches accords to the following rules:

for two linear source IP address bunches $B_1=\{F_1+n\cdot i_1, i_1=0, 1, p_1-1\}$ and $B_2=\{F_2+n\cdot i_2, i_2=0, 1, p_2-1\}$, if:

$$F_2=F_1+n\cdot(p_1-1),$$

then the two source IP address bunches $B_1$ and $B_1$ can be merged into a linear source IP address bunch $B=\{F_1+n\cdot i, i=0, 1, 2, p_2-1\}$;

merging the exponential source IP address bunches comprises splicing merging and containing merging;

the splicing merging refers to splicing multiple small source IP address bunches into a large source IP address bunch through an iterative method, two small source IP address bunches are:

$$B_1=\{F_1+n\cdot(2^i-1), i=0,1,p\},$$

$$B_2=\{F_2+m\cdot(2^j-1), j=0,1,q\},$$

if $F_2=F_1+n\cdot(2^{p+1}-1)$, $m=n\cdot 2^{p+1}$, then $B_1$ and $B_2$ can be merged into B: $B=\{F_1+n\cdot(2^k-1), k=0, 1, p+q+1\}$;

the containing merging means that the domain of a first source IP address bunch B is included in the domain of a second source IP address bunch $B_0$, $B_0=\{F_0+n\cdot(2^i-1), i=0, 1, u\}$, $B=\{F+m\cdot(2^j-1), j=0, 1, v\}$;

if $u>v$ and there exists $x\in\{0, 1, u-v\}$ such that $F=F_0+n\cdot(2^x-1)$, $m=n\cdot 2^x$ established, then the second source IP address bunch $B_0$ contains the first source IP address bunch B, and the source IP address bunch $B_0$ and B are merged.

14. The method of claim 1, wherein the association A specifies whether the association function is the liner association or the exponential association, the exponential base b specifies a base value of the exponential association, the filter symbol M is an operator which first gets the first M bit of a bit sequence of m length, M≤m, and right splices (m−M) zeros; the filter symbol M is an arithmetic operation for Address, expressed as: Address/(m−M); the offset O specifies the distance between a front end of a specific source IP address block containing the specific IP address D and a front end of a root block of a source IP address bunch which comprises the specific source IP address block;

for the linear association, the offset O is a difference between the front end of the specific source IP address block containing the specific IP address D and the front end of the root block of the source IP address bunch which comprises the specific source IP address block;

for the exponential association, the offset O is a difference between an exponential value of the specific source IP address block containing the specific IP address D and an exponential value of the root block of the source IP address bunch which comprises the specific source IP address block;

the linear association comprises subtracting the offset O from H to get a handle $H_b$ of the specific source IP address bunch containing the specific IP address D;

the exponential association comprises left moving (m−M) the offset O of the specific IP address D to get a second offset O' according to the filter symbol M of the specific IP address D, subtracting the second offset O' from H to get the handle $H_b$ of the specific source IP address bunch containing the specific IP address D; and the linear association and the exponential association are performed under the meaning of module, and the module is a total number of the IP addresses.

* * * * *